United States Patent
Back et al.

(10) Patent No.: US 11,258,548 B2
(45) Date of Patent: Feb. 22, 2022

(54) V2X COMMUNICATION APPARATUS AND GEO-NETWORKING TRANSMISSION METHOD

(71) Applicant: LG ELECTRONICS INC., Seoul (KR)

(72) Inventors: Seoyoung Back, Seoul (KR); Woosuk Ko, Seoul (KR); Seungryul Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 61 days.

(21) Appl. No.: 16/632,232

(22) PCT Filed: Jul. 18, 2017

(86) PCT No.: PCT/KR2017/007714
§ 371 (c)(1),
(2) Date: Jan. 17, 2020

(87) PCT Pub. No.: WO2019/017506
PCT Pub. Date: Jan. 24, 2019

(65) Prior Publication Data
US 2020/0177325 A1    Jun. 4, 2020

(51) Int. Cl.
*H04W 72/04*    (2009.01)
*H04L 1/18*    (2006.01)
*H04W 4/40*    (2018.01)
*H04L 47/34*    (2022.01)
*H04W 28/02*    (2009.01)
(Continued)

(52) U.S. Cl.
CPC ............ *H04L 1/1883* (2013.01); *H04L 47/34* (2013.01); *H04W 4/40* (2018.02); *H04W 28/0226* (2013.01); *H04W 40/026* (2013.01); *H04W 40/20* (2013.01); *H04W 84/18* (2013.01)

(58) Field of Classification Search
None
See application file for complete search history.

(56) References Cited

U.S. PATENT DOCUMENTS

2013/0301406 A1    11/2013    Sakata
2016/0080235 A1    3/2016    Tan et al.

FOREIGN PATENT DOCUMENTS

EP    2262188 A1    12/2010
JP    2008176370 A    7/2008

OTHER PUBLICATIONS

NEC Europe Ltd. et al., "Intelligent Transport System (ITS); Vehicular communications; GeoNetworking; Part 4: Geographical addressing and forwarding for point-to-point and point-to-multipoint communications; Sub-part 1: Media-Independent Functionality", ETSI TS 102 636-4-1, V1.1.1, Jun. 14, 2011.

Primary Examiner — Willie J Daniel, Jr.
(74) Attorney, Agent, or Firm — Dentons US LLP

(57) ABSTRACT

Disclosed is a geo-networking transmission method of a V2X communication apparatus. The geo-networking transmission method according to an embodiment of the present disclosure includes receiving a geo-networking packet; identifying whether the received geo-networking packet is a packet which is prestored in a buffer; determining whether to perform a forwarding progress of the geo-networking packet, when the received geo-networking packet is not a prestored packet; storing the received geo-networking packet in the buffer and starting a timer, when the forwarding progress is determined; and transmitting the geo-networking packet, when the timer expires.

3 Claims, 29 Drawing Sheets

(51) Int. Cl.
*H04W 40/02* (2009.01)
*H04W 40/20* (2009.01)
*H04W 84/18* (2009.01)

Fig. 3

```
 0                   1                   2                   3
 0 1 2 3 4 5 6 7 0 1 2 3 4 5 6 7 0 1 2 3 4 5 6 7 0 1 2 3 4 5 6 7
|Version|  NH   |      Reserved     |       LT      |      RHL      |
```

(a)

```
 0                   1                   2                   3
 0 1 2 3 4 5 6 7 0 1 2 3 4 5 6 7 0 1 2 3 4 5 6 7 0 1 2 3 4 5 6 7
|  NH   |Reserved|  HT   |  HST  |       TC      |     Flags     |
|              PL               |      MHL      |    Reserved    |
```

(b)

Fig. 4
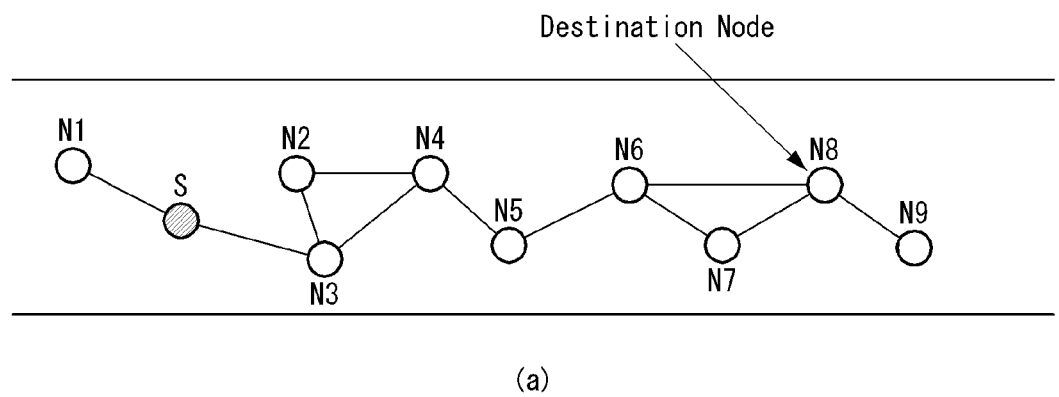
(a)
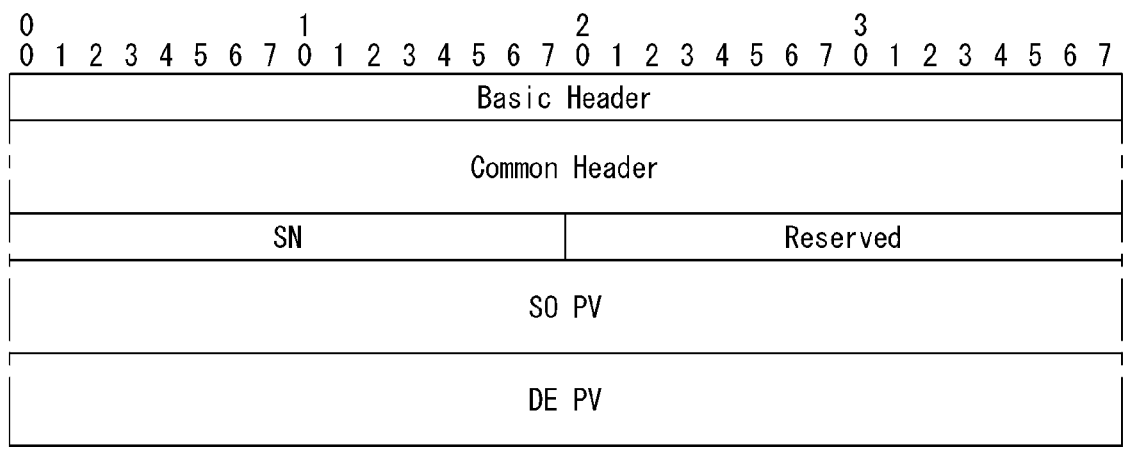
(b)

Fig. 5
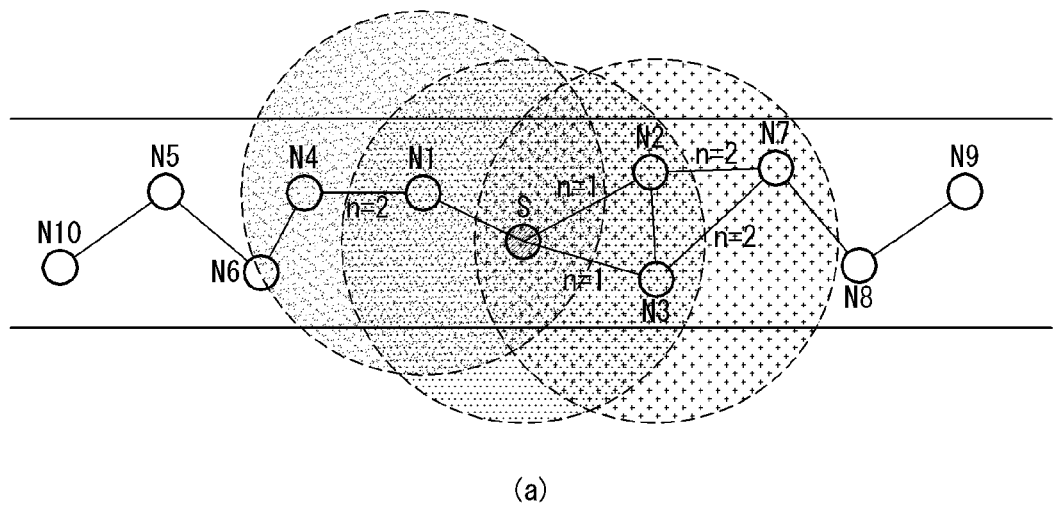
(a)
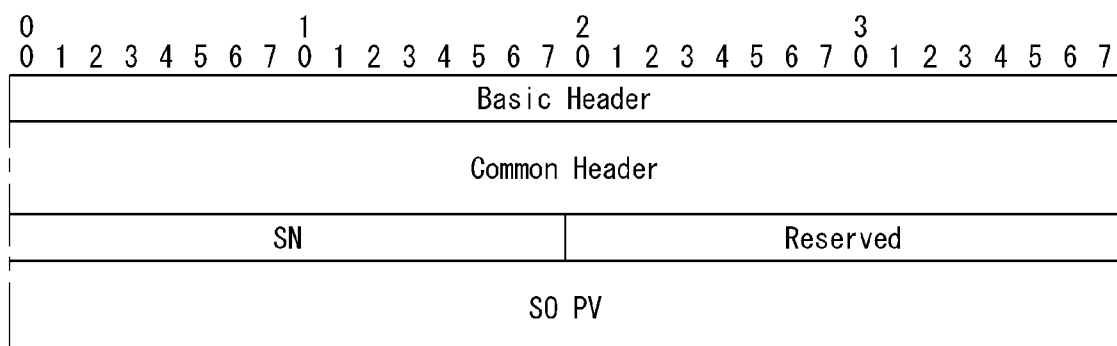
(b)

Fig. 6
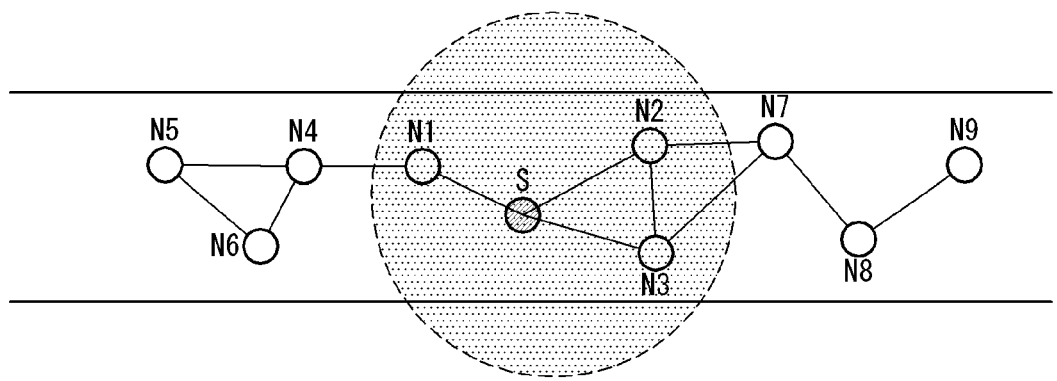
(a)
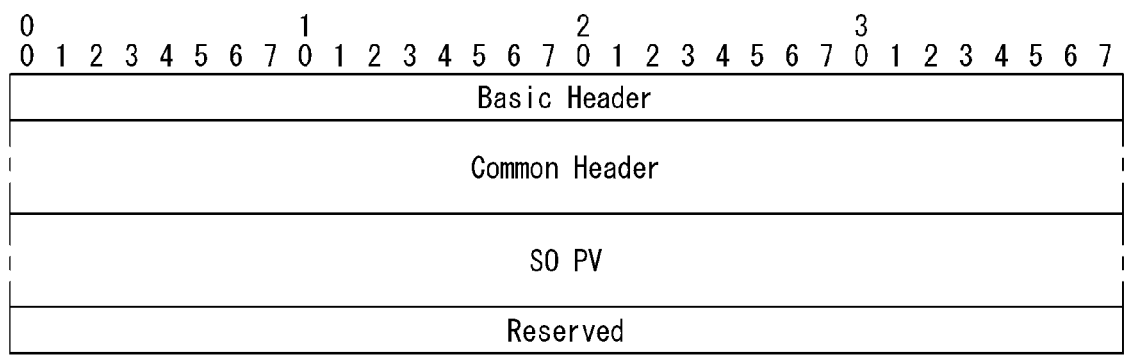
(b)

Fig. 7
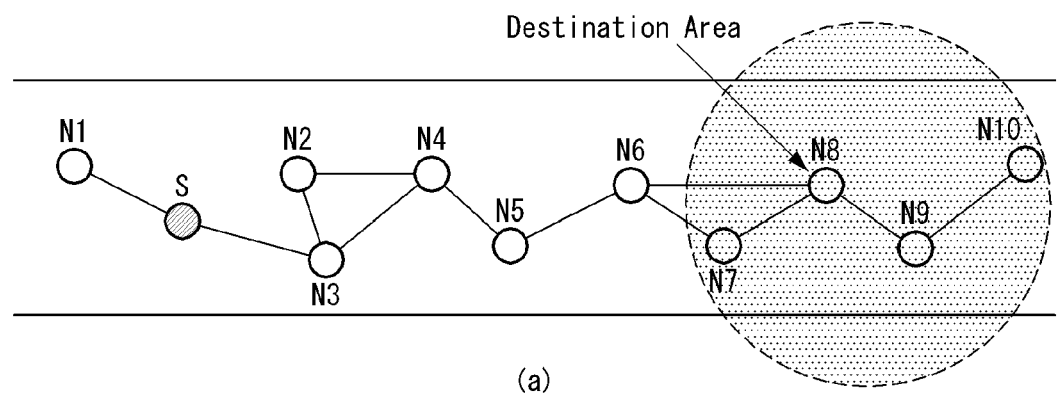
(a)
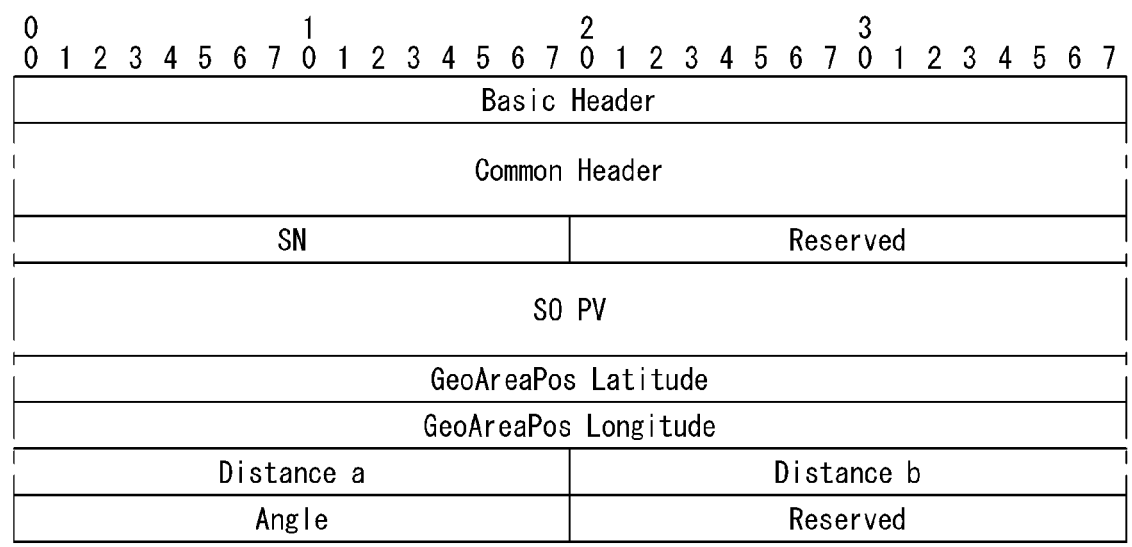
(b)

Fig. 9
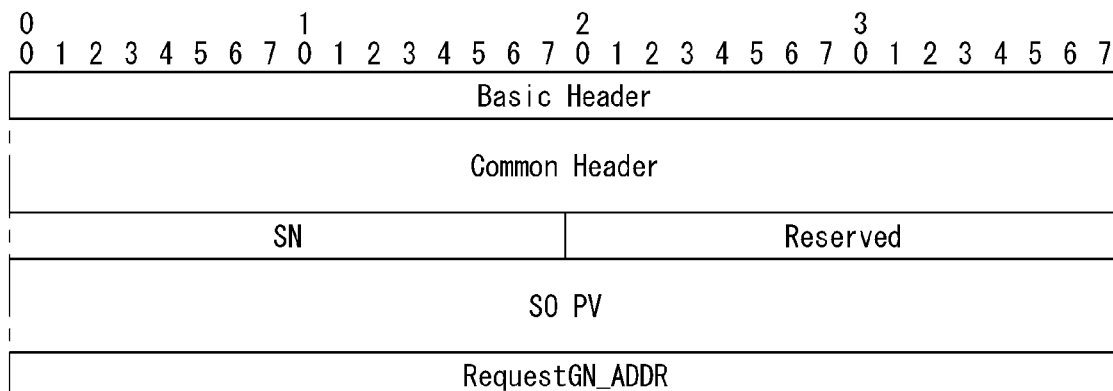
(a)
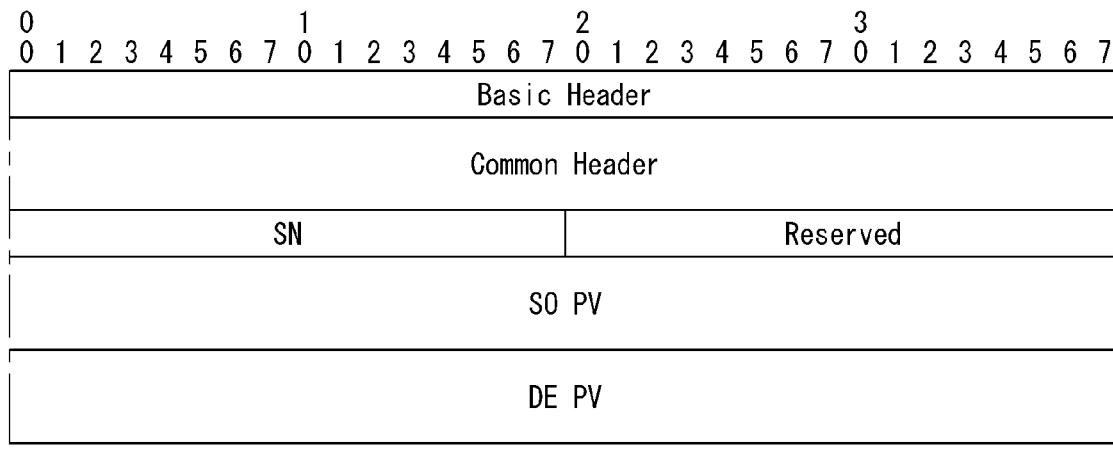
(b)

Fig. 10
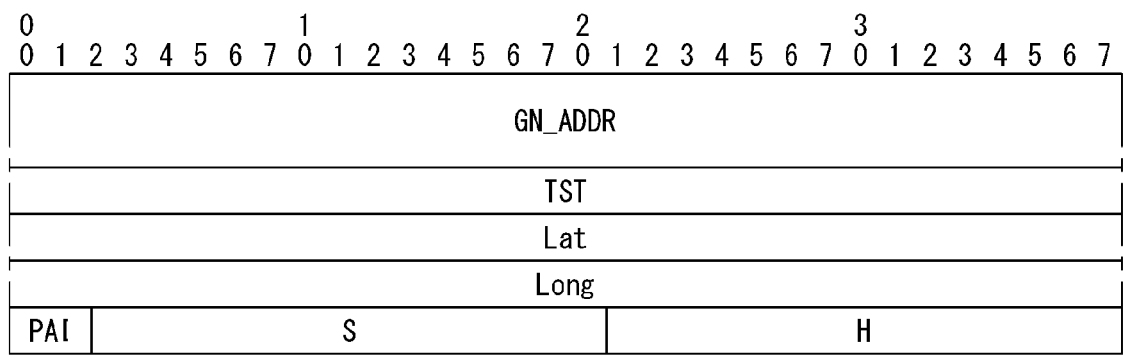
(a)
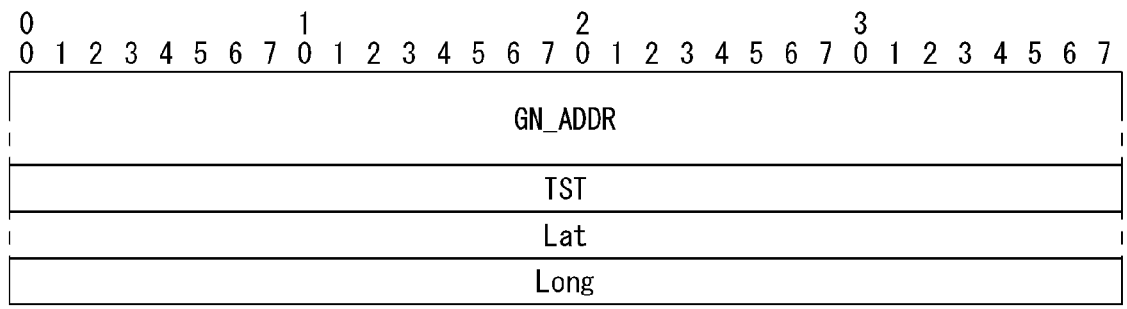
(b)

Fig. 14

```
1   -- P is the GN packet to be forwarded
2   -- EPV is the ego position vector
3   -- PV_P is the destination position vector contained in the GeoNetworking packet
4   -- PV_SE is the sender position vector in the LocT with position accuracy indicator PAI_SE
5   -- B is the CBF packet buffer
6   -- TO is the timeout that triggers the re-broadcast of the packet
7   -- NH_LL_ADDR is the LL address of the next hop
8   -- BCAST is the Broadcast LL address
9
10  IF (P is from local node) THEN
11     SET NH_LL_ADDR ← BCAST
12     RETURN NH_LL_ADDR                  # Indicates that packet can be forwarded
13  END
14  IF (P IN B) THEN                      # Contending
15     REMOVE P FROM B
16     STOP TIMER
17     DISCARD P
18     RETURN -1                          # Indicates that packet is discarded
19  ELSE                                  # New packet
20     IF (((PV_SE EXISTS) OR (PV_SE = EPV)) AND (PAI_SE = TRUE)) THEN
21        SET PROG ← (DIST(PV_P, PV_SE) - DIST(PV_P, EPV))
22        IF (PROG > 0) THEN              # Forwarding progress
23           ADD P TO B
24           SET TO                       # Eq. E.1 in the present clause
25           START TIMER(TO)
26           RETURN 0                     # Indicates that packet is buffered
27        ELSE
28           DISCARD P
29           RETURN -1                    # Indicates that packet is discarded
30        ENDIF
31     ELSE
32        ADD P TO B
33        SET TO ← TO_CBF_MAX
34        RETURN 0                        # Indicates that packet is buffered
35     ENDIF
36  ENDIF
37
38  IF (TIMER(TO) EXPIRES) THEN
39     FETCH P FROM B
40     SET NH_LL_ADDR ← BCAST
41     RETURN NH_LL_ADDR                  # Indicates that packet can be forwarded
42  ENDIF
```

Fig. 16
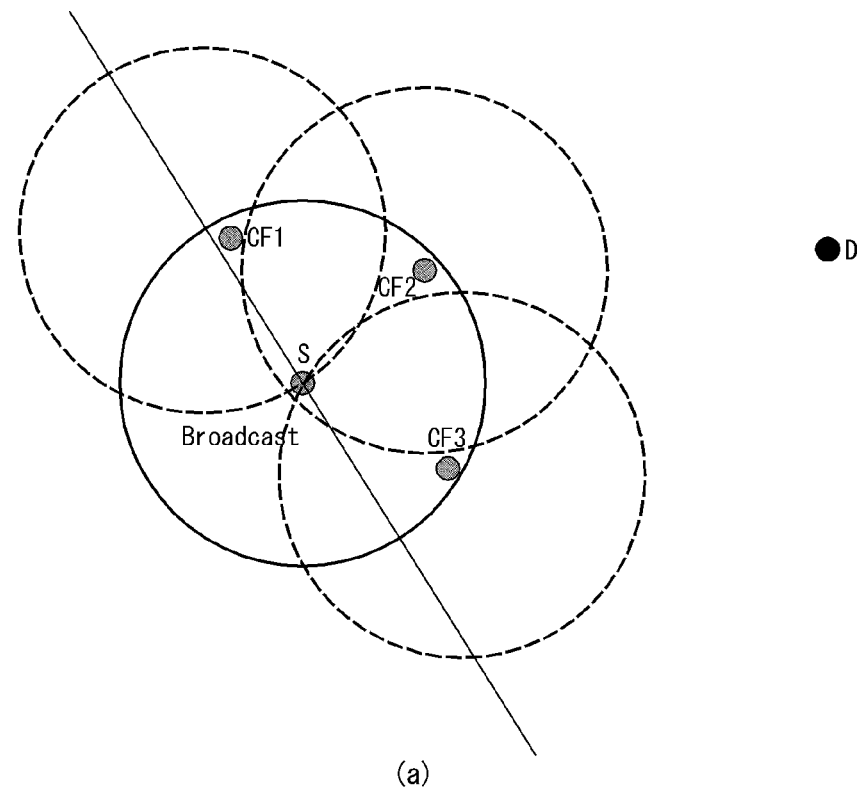
(a)
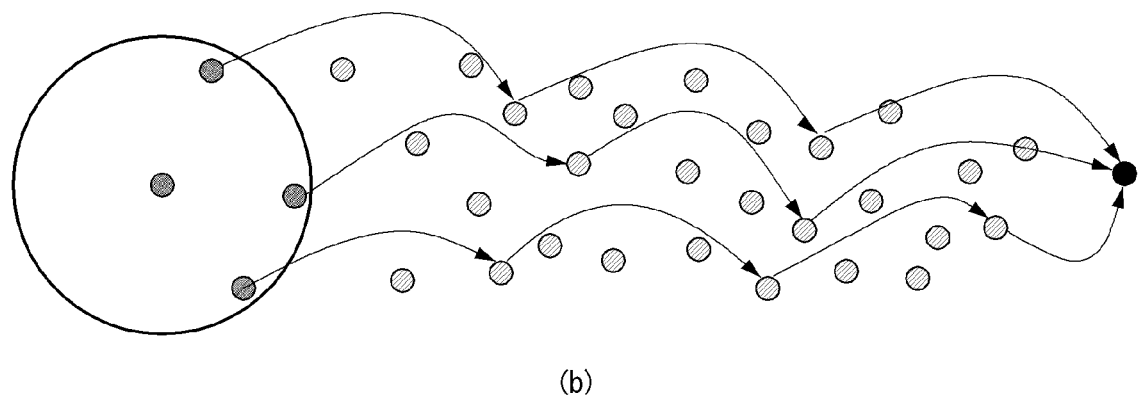
(b)

Fig. 18

```
1   -- P is the GN packet to be forwarded
2   -- EPV is the ego position vector
3   -- PV_P is the destination position vector contained in the GeoNetworking packet
4   -- PV_SE is the sender position vector in the LocT with position accuracy indicator PAI_SE
5   -- B is the CBF packet buffer
6   -- TO is the timeout that triggers the re-broadcast of the packet
7   -- NH_LL_ADDR is the LL address of the next hop
8   -- BCAST is the Broadcast LL address
9   -- X-th is threshold distance to the destination direction within communication radius
10
11  IF (P is from local node) THEN
12     SET NH_LL_ADDR ← BCAST
13     RETURN NH_LL_ADDR                  # Indicates that packet can be forwarded
14  END
15  IF (P IN B) THEN                      # Contending
16     REMOVE P FROM B
17     STOP TIMER
18     DISCARD P
19     RETURN -1                          # Indicates that packet is discarded
20  ELSE                                  # New packet
21     IF (((PV_SE EXISTS) OR (PV_SE = EPV)) AND (PAI_SE = TRUE)) THEN
22        SET PROG ← (DIST(PV_P, PV_SE) - DIST(PV_P, EPV))
23        IF (PROG > X-th) THEN           # Forwarding progress
24           ADD P TO B
25           SET TO                       # Eq. E.1 in the present clause
26           START TIMER(TO)
27           RETURN 0                     # Indicates that packet is buffered
28        ELSE
29           DISCARD P
30           RETURN -1                    # Indicates that packet is discarded
31        ENDIF
32     ELSE
33        ADD P TO B
34        SET TO ← TO_CBF_MAX
35        RETURN 0                        # Indicates that packet is buffered
36     ENDIF
37  ENDIF
38
39  IF (TIMER(TO) EXPIRES) THEN
40     FETCH P FROM B
41     SET NH_LL_ADDR ← BCAST
42     RETURN NH_LL_ADDR                  # Indicates that packet can be forwarded
43  ENDIF
```

Fig. 20

```
1   — P is the GN packet to be forwarded
2   — EPV is the ego position vector
3   — PV_P is the destination position vector contained in the GeoNetworking packet
4   — PV_SE is the sender position vector in the LocT with position accuracy indicator PAI_SE
5   — B is the CBF packet buffer
6   — TO is the timeout that triggers the re-broadcast of the packet
7   — NH_LL_ADDR is the LL address of the next hop
8   — BCAST is the Broadcast LL address
9   — Y-th is the threshold distance to the orthogonal direction from sender to destination
    within communication radius
10  — Y-DIST is the distance from ego to the line between sender and destination
11  — θ is the angle between destination and ego from sender
12  IF (P is from local node) THEN
13      SET NH_LL_ADDR ← BCAST
14      RETURN NH_LL_ADDR                    # Indicates that packet can be forwarded
15  END
16  IF (P IN B) THEN                         # Contending
17      REMOVE P FROM B
18      STOP TIMER
19      DISCARD P
20      RETURN -1                            # Indicates that packet is discarded
21  ELSE                                     # New packet
22      IF (((PV_SE EXISTS) OR (PV_SE = EPV)) AND (PAI_SE = TRUE)) THEN
23          SET PROG ← (DIST(PV_P, PV_SE) - DIST(PV_P, EPV))
24          SET θ ← ANGLE(EPV, PV_SE, PV_P)
25          Y-DIST ← DIST(PV_SE, EPV) * sin(θ)
26          IF (PROG > 0) AND (Y-DIST < Y-TH) THEN    # Forwarding progress
27              ADD P TO B
28              SET TO                       # Eq. E.1 in the present clause
29              START TIMER(TO)
30              RETURN 0                     # Indicates that packet is buffered
31          ELSE
32              DISCARD P
33              RETURN -1                    # Indicates that packet is discarded
34          ENDIF
35      ELSE
36          ADD P TO B
37          SET TO ← TO_CBF_MAX
38          RETURN 0                         # Indicates that packet is buffered
39      ENDIF
40  ENDIF
41
42  IF (TIMER(TO) EXPIRES) THEN
43      FETCH P FROM B
44      SET NH_LL_ADDR ← BCAST
45      RETURN NH_LL_ADDR                    # Indicates that packet can be forwarded
46  ENDIF
```

Fig. 22

```
1   -- P is the GN packet to be forwarded
2   -- EPV is the ego position vector
3   -- PV_P is the destination position vector contained in the GeoNetworking packet
4   -- PV_SE is the sender position vector in the LocT with position accuracy indicator PAI_SE
5   -- B is the CBF packet buffer
6   -- TO is the timeout that triggers the re-broadcast of the packet
7   -- NH_LL_ADDR is the LL address of the next hop
8   -- BCAST is the Broadcast LL address
9   -- Y-th is the threshold distance to the orthogonal direction from destination within
    communication radius
10  -- Y-DIST is the distance from ego to the line between sender and destination
11  -- θ is the angle between destination and ego from sender
12  IF (P is from local node) THEN
13      SET NH_LL_ADDR ← BCAST
14      RETURN NH_LL_ADDR                   # Indicates that packet can be forwarded
15  END
16  IF (P IN B) THEN                        # Contending
17      REMOVE P FROM B
18      STOP TIMER
19      DISCARD P
20      RETURN -1                           # Indicates that packet is discarded
21  ELSE                                    # New packet
22      IF (((PV_SE EXISTS) OR (PV_SE = EPV)) AND (PAI_SE = TRUE)) THEN
23          SET PROG ← (DIST(PV_P, PV_SE) - DIST(PV_P, EPV))
24          SET θ ← ANGLE(EPV, PV_SE, PV_P)
25          Y-DIST ← PV_SE * sin(θ)
26          IF (PROG > X-th) AND(Y-DIST < Y-TH) THEN # Forwarding progress
27              ADD P TO B
28              SET TO                      # Eq. E.1 in the present clause
29              START TIMER(TO)
30              RETURN 0                    # Indicates that packet is buffered
31          ELSE
32              DISCARD P
33              RETURN -1                   # Indicates that packet is discarded
34          ENDIF
35      ELSE
36          ADD P TO B
37          SET TO ← TO_CBF_MAX
38          RETURN 0                        # Indicates that packet is buffered
39      ENDIF
40  ENDIF
41
42  IF (TIMER(TO) EXPIRES) THEN
43      FETCH P FROM B
44      SET NH_LL_ADDR ← BCAST
45      RETURN NH_LL_ADDR                   # Indicates that packet can be forwarded
46  ENDIF
```

Fig. 24

```
1   -- P is the GN packet to be forwarded
2   -- EPV is the ego position vector
3   -- PV_P is the destination position vector contained in the GeoNetworking packet
4   -- PV_SE is the sender position vector in the LocT with position accuracy indicator PAI_SE
5   -- B is the CBF packet buffer
6   -- TO is the timeout that triggers the re-broadcast of the packet
7   -- NH_LL_ADDR is the LL address of the next hop
8   -- BCAST is the Broadcast LL address
9   -- θ is the angle between destination and ego from sender
10  -- θ-th is the threshold angle toward destination
11  IF (P is from local node) THEN
12     SET NH_LL_ADDR ← BCAST
13     RETURN NH_LL_ADDR              # Indicates that packet can be forwarded
14  END
15  IF (P IN B) THEN                  # Contending
16     REMOVE P FROM B
17     STOP TIMER
18     DISCARD P
19     RETURN -1                      # Indicates that packet is discarded
20  ELSE                              # New packet
21     IF (((PV_SE EXISTS) OR (PV_SE = EPV)) AND (PAI_SE = TRUE)) THEN
22        SET PROG ← (DIST(PV_P, PV_SE) - DIST(PV_P, EPV))
23        SET θ ← ANGLE(EPV, PV_SE, PV_P)
24        IF (PROG > 0) AND(θ<|θ_th|) THEN  # Forwarding progress
25           ADD P TO B
26           SET TO                   # Eq. E.1 in the present clause
27           START TIMER(TO)
28           RETURN 0                 # Indicates that packet is buffered
29        ELSE
30           DISCARD P
31           RETURN -1                # Indicates that packet is discarded
32        ENDIF
33     ELSE
34        ADD P TO B
35        SET TO ← TO_CBF_MAX
36        RETURN 0                    # Indicates that packet is buffered
37     ENDIF
38  ENDIF
39
40  IF (TIMER(TO) EXPIRES) THEN
41     FETCH P FROM B
42     SET NH_LL_ADDR ← BCAST
43     RETURN NH_LL_ADDR              # Indicates that packet can be forwarded
44  ENDIF
```

Fig. 25

```
 0                   1                   2                   3
 0 1 2 3 4 5 6 7 0 1 2 3 4 5 6 7 0 1 2 3 4 5 6 7 0 1 2 3 4 5 6 7
|Version|  NH  |   X-Distance  |       LT      |      RHL      |
```
or
```
 0                   1                   2                   3
 0 1 2 3 4 5 6 7 0 1 2 3 4 5 6 7 0 1 2 3 4 5 6 7 0 1 2 3 4 5 6 7
|Version|  NH  |    Reserved   |       LT      |X-Distance| RHL|
```
(a)

```
 0                   1                   2                   3
 0 1 2 3 4 5 6 7 0 1 2 3 4 5 6 7 0 1 2 3 4 5 6 7 0 1 2 3 4 5 6 7
|Version|  NH  |   Y-Distance  |       LT      |      RHL      |
```
or
```
 0                   1                   2                   3
 0 1 2 3 4 5 6 7 0 1 2 3 4 5 6 7 0 1 2 3 4 5 6 7 0 1 2 3 4 5 6 7
|Version|  NH  |    Reserved   |       LT      |Y-Distance| RHL|
```
(b)

```
 0                   1                   2                   3
 0 1 2 3 4 5 6 7 0 1 2 3 4 5 6 7 0 1 2 3 4 5 6 7 0 1 2 3 4 5 6 7
|Version|  NH  |X-Distance|Y-Distance|    LT   |      RHL      |
```
(c)

```
 0                   1                   2                   3
 0 1 2 3 4 5 6 7 0 1 2 3 4 5 6 7 0 1 2 3 4 5 6 7 0 1 2 3 4 5 6 7
|Version|  NH  |     ANGLE     |       LT      |      RHL      |
```
or
```
 0                   1                   2                   3
 0 1 2 3 4 5 6 7 0 1 2 3 4 5 6 7 0 1 2 3 4 5 6 7 0 1 2 3 4 5 6 7
|Version|  NH  |    Reserved   |       LT      |  ANGLE  | RHL |
```
(d)

V2X COMMUNICATION APPARATUS AND GEO-NETWORKING TRANSMISSION METHOD

This application is the National Phase of PCT International Application No. PCT/KR2017/007714, filed on Jul. 18, 2017, the contents of which are all hereby incorporated by reference herein in their entirety.

TECHNICAL FIELD

The present disclosure relates to an apparatus for a V2X communication and geo-networking transmission method thereof, and, more particularly, to a forwarding algorithm that may forward data out of transmission range reliably.

BACKGROUND ART

In recent years, vehicles have become a result of complex industrial technology, which is a fusion of electric, electronic and communication technologies, from centering on mechanical engineering, and the vehicle is also called a smart car in such an aspect. Smart cars have been providing various customized mobile services as well as traditional vehicle technology such as traffic safety/complicatedness by connecting drivers, vehicles, and transportation infrastructures. The connectivity may be implemented using vehicle to everything (V2X) communication technology.

DISCLOSURE

Technical Problem

Various services can be provided through a V2X communication. Furthermore, multiple frequency bands are used for providing the various services. Even in such an environment, highly reliable forwarding and providing of safety services are very important matters considering the characteristics of a V2X communication.

In order to transmit data out of transmission range, a geo-networking transmission method that uses hopping may be used. In a geo-networking transmission, a packet forwarding algorithm may be used for data hopping and forwarding it to a destination. Particularly, in a V2X communication environment in which a communication environment changes dynamically, efficiency and reliability need to be considered for the packet forwarding algorithm.

Technical Solution

In order to solve the technical problem above, a geo-networking transmission method of a V2X communication apparatus according to an embodiment of the present disclosure includes receiving a geo-networking packet; identifying whether the received geo-networking packet is a packet which is prestored in a buffer; determining whether to perform a forwarding progress of the geo-networking packet, when the received geo-networking packet is not a prestored packet; storing the received geo-networking packet in the buffer and starting a timer, when the forwarding progress is determined; and transmitting the geo-networking packet, when the timer expires.

According to the geo-networking transmission method of a V2X communication apparatus according to an embodiment of the present disclosure, the geo-networking packet may include threshold information for limiting a valid transmission area, and the step of determining whether to perform the forwarding progress may further include determining whether the V2X communication apparatus is positioned in the valid transmission area.

According to the geo-networking transmission method of a V2X communication apparatus according to an embodiment of the present disclosure, the threshold information may include at least one of a X-axis threshold distance, a Y-axis threshold distance and a threshold angle, and the X-axis threshold distance may indicate a destination direction threshold distance in a communication range, the Y-axis threshold distance may indicate a threshold distance in a direction perpendicular to destination in a communication range and the threshold angle may indicate a destination direction threshold angle.

According to the geo-networking transmission method of a V2X communication apparatus according to an embodiment of the present disclosure, the step of determining whether the V2X communication apparatus is positioned in the valid transmission area may be performed by setting a PROG value which is a difference between a distance between a source router and a destination and a distance between the destination and the V2X communication apparatus and determining whether the PROG value is greater than the X-axis threshold distance.

According to the geo-networking transmission method of a V2X communication apparatus according to an embodiment of the present disclosure, the step of determining whether the V2X communication apparatus is positioned in the valid transmission area may be performed by setting a PROG value which is a difference between a distance between a source router and a destination and a distance between the destination and the V2X communication apparatus and determining whether the PROG value is greater than 0 and a Y-axis distance of the V2X communication apparatus is smaller than the Y-axis threshold distance, and the Y-axis distance may be a vertical distance from a line connecting the source router of the V2X communication apparatus and the destination.

According to the geo-networking transmission method of a V2X communication apparatus according to an embodiment of the present disclosure, the step of determining whether the V2X communication apparatus is positioned in the valid transmission area may be performed by setting a PROG value which is a difference between a distance between a source router and a destination and a distance between the destination and the V2X communication apparatus and determining whether the PROG value is greater than the X-axis threshold distance and a Y-axis distance of the V2X communication apparatus is smaller than the Y-axis threshold distance, and the Y-axis distance may be a vertical distance from a line connecting the source router of the V2X communication apparatus and the destination.

According to the geo-networking transmission method of a V2X communication apparatus according to an embodiment of the present disclosure, the step of determining whether the V2X communication apparatus is positioned in the valid transmission area may be performed by setting a PROG value which is a difference between a distance between a source router and a destination and a distance between the destination and the V2X communication apparatus and determining whether the PROG value is greater than 0 and an angle of the V2X communication apparatus is less than the threshold angle, and the angle of the V2X communication apparatus may be an angle between a vector in a direction from the source router to the destination and a vector in a direction from the source router to the V2X communication apparatus.

According to the geo-networking transmission method of a V2X communication apparatus according to an embodiment of the present disclosure, when the V2X communication apparatus is positioned within the valid transmission area, the V2X communication apparatus may perform the step of storing the packet and starting a timer, and when the V2X communication apparatus is not positioned within the valid transmission area, the geo-networking transmission method may further include discarding the geo-networking packet.

In addition, in order to solve the technical problem above, a V2X communication apparatus according to an embodiment of the present disclosure may include a memory for storing data; a communication unit for transmitting and receiving a radio signal including a geo-networking packet; and a processor for controlling the memory and the communication unit, and the processor is configured to: receive a geo-networking packet; identify whether the received geo-networking packet is a packet which is prestored in a buffer; determine whether to perform a forwarding progress of the geo-networking packet, when the received geo-networking packet is not a prestored packet; store the received geo-networking packet in the buffer and start a timer, when the forwarding progress is determined; and transmit the geo-networking packet, when the timer expires.

Advantageous Effects

According to the present disclosure, highly reliable geo-networking transmission may be provided for dynamic communication environment. Furthermore, an effective transmission range is limited for selecting a candidate router that forwards a reception packet, and a transmission of redundant packet may be prevented. Since redundant packet transmission is prevented, a channel use efficiency for geo-networking may be improved. The present disclosure may maintain an effect of reliability improvement of a contents-based forwarding algorithm, and simultaneously, channel load increase and redundant transmission thereof may be prevented.

DESCRIPTION OF DRAWINGS

The accompany drawings, which are included to provide a further understanding of the present disclosure and are incorporated on and constitute a part of this specification illustrate embodiments of the present disclosure and together with the description that serves to describe the principles of the present disclosure.

FIG. 3 illustrates a header structure of a geo-networking packet according to an embodiment of the present disclosure.

FIG. 4 illustrates a geo-networking type and a header configuration thereof according to an embodiment of the present disclosure.

FIG. 5 illustrates a geo-networking type and a header configuration thereof according to another embodiment of the present disclosure.

FIG. 6 illustrates a geo-networking type and a header configuration thereof according to another embodiment of the present disclosure.

FIG. 7 illustrates a geo-networking type and a header configuration thereof according to another embodiment of the present disclosure.

FIG. 9 illustrates a configuration of Location Service (LS) request and LS reply type packets according to an embodiment of the present disclosure.

FIG. 10 illustrates position vector information according to an embodiment of the present disclosure.

FIG. 14 illustrates a pseudo-code of the CBF algorithm according to an embodiment of the present disclosure.

FIG. 16 illustrates operations of routers that implement the contention-based forwarding (CBF) algorithm according to another embodiment of the present disclosure.

FIG. 18 illustrates a pseudo-code of the CBF algorithm according to the embodiment of FIG. 17.

FIG. 20 illustrates a pseudo-code of the CBF algorithm according to the embodiment of FIG. 19.

FIG. 22 illustrates a pseudo-code of the CBF algorithm according to the embodiment of FIG. 21.

FIG. 24 illustrates a pseudo-code of the CBF algorithm according to the embodiment of FIG. 23.

FIG. 25 illustrates a transmission method of valid transmission area related information for applying the CBR algorithm according to an embodiment of the present disclosure.

BEST MODE FOR INVENTION

Figure 1:
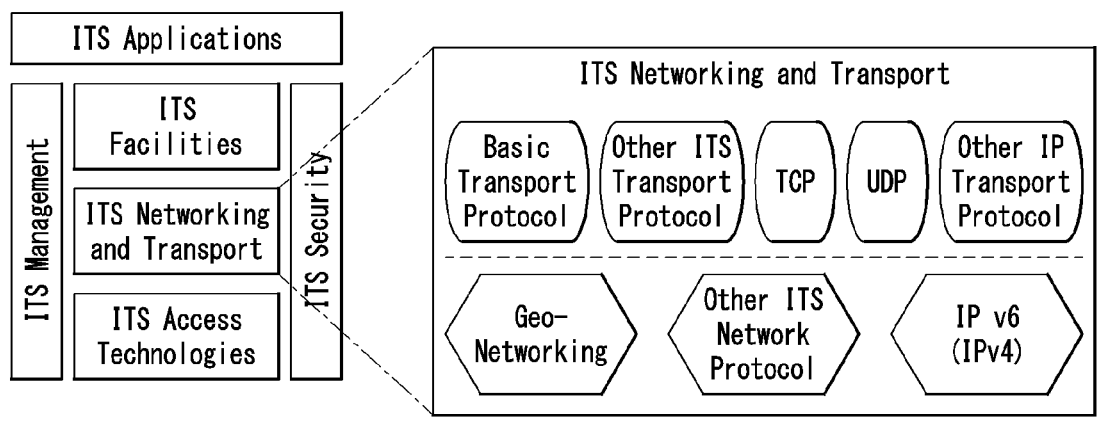
FIG. 1 illustrates a protocol structure of an ITS system according to an embodiment of the present disclosure.

Preferred embodiments of the present disclosure are described in detail and examples thereof are illustrated in the accompanying drawings. The following detailed description with reference to the accompanying drawings is intended to illustrate the preferred embodiments of the present disclosure rather than merely illustrating embodiments that may be implemented according to embodiments of the present disclosure. The following detailed description includes details in order to provide a thorough understanding of the present disclosure, but the present disclosure does not require all these details. In the present disclosure, respective embodiments described below need not be particularly used separately. Multiple embodiments or all embodiments may be used together, and specific embodiments may be used as a combination.

Most of the terms used in the present disclosure are selected from the general ones that are widely used in the field, but some terms are arbitrarily selected by the applicant and the meaning thereof will be described in detail in the following description as necessary. Accordingly, the invention should be understood based on the intended meaning of the term rather than the mere name or meaning of the term.

The present disclosure relates to a V2X communication apparatus and the V2X communication apparatus is included in an Intelligent Transport System (ITS) to perform all or some functions of the ITS. The V2X communication apparatus may communicate with vehicles and vehicles, vehicles and infrastructure, vehicles and bicycles, and mobile devices. The V2X communication apparatus may be abbreviated as a V2X apparatus. As an embodiment, the V2X apparatus may correspond to an on board unit (OBU) of the vehicle or may be included in the OBU.

The OBU may also be referred to as on a board equipment (OBE). The V2X apparatus may correspond to a road side unit (RSU) of the infrastructure or may be included in the RSU. The RSU may also be referred to as a road side equipment (RSE). Alternatively, the V2X communication apparatus may correspond to an ITS station or may be included in the ITS station. All of a predetermined OBU, a predetermined RSU, and a predetermined mobile equipment that perform V2X communication may also be referred to as the ITS station or the V2X communication apparatus. In the geo-networking communication, the V2X communication apparatus may also be referred to as a router.

The V2X communication apparatus may communicate based on various communication protocols. The V2X communication apparatus may implement Wireless Access In Vehicular Environments (WAVE) protocol of IEEE 1609.1-4 standard.

The V2X communication apparatus may transmit a Cooperative Awareness Message (CAM) or a Decentralized Environmental Notification Message (DENM).

The CAM is distributed in an ITS network and provides information of at least one of a presence, a position, a communication state or an operation state of an ITS station. The DENM provides information for a detected event. The DENM may provide information for an arbitrary driving situation or event which is detected by an ITS station. For example, the DENM may provide information for situations such as an emergency electronic brake lamp, a vehicle accident, a vehicle problem, a traffic condition, and the like.

FIG. 1 illustrates a protocol structure of an ITS system according to an embodiment of the present disclosure.

Application layer: The application layer may implement and support various use cases. For example, an application may provide road safety, efficient traffic information, and other application information.

Facilities layer: The facility layer may support various use-cases defined in the application layer so as to effectively implement various use-cases. For example, the facility layer may perform application support, information support, and session/communication support.

Access layer: The access layer may transmit messages/data received by the upper layer through a physical channel. For example, the access layer may perform/support data communication based on IEEE 802.11 and/or 802.11p standard-based communication technology, ITS-G5 wireless communication technology based on physical transmission technology of the IEEE 802.11 and/or 802.11p standards, 2G/3G/4G (LTE)/5G wireless cellular communication technology including satellite/broadband wireless mobile communication, broadband terrestrial digital broadcasting technology such as DVB-T/T2/ATSC, GPS technology, IEEE 1609 WAVE technology, and the like.

Networking & Transport layer: The network/transport layer may configure a network for vehicle communication between homogeneous/heterogeneous networks by using various transport protocols and network protocols.

The transport layer corresponds to a connection layer between services providing upper layers (session layer, presentation layer and application layer) and lower layers (network layer, data link layer and physical layer). The transport layer serves to manage data sent by a user to accurately arrive at a destination. At a transmitting side, the transport layer may serve to split data into packets having an appropriate size for transmission for efficient data transmission. At a receiving side, the transport layer may serve to recombine the received packets into an original file. As an embodiment, the transport protocol may adopt Transmission Control Protocol (TCP), User Datagram Protocol (UDP) and Basic Transport Protocol (BTP) as a transport protocol.

The network layer may manage a logical address and decide a packet transfer path. The network layer may receive a packet generated in the transport layer and add the logical address of the destination in a network layer header. As an embodiment of a packet path, unicast/broadcast may be considered between vehicles, between a vehicle and a fixation station, and between fixation stations. As an embodiment, as the network protocol, a geo-networking, IPv6 networking with mobility support, IPv6 over geo-networking, or the like may be considered.

The ITS architecture may further include a management layer and a security layer.

Figure 2:
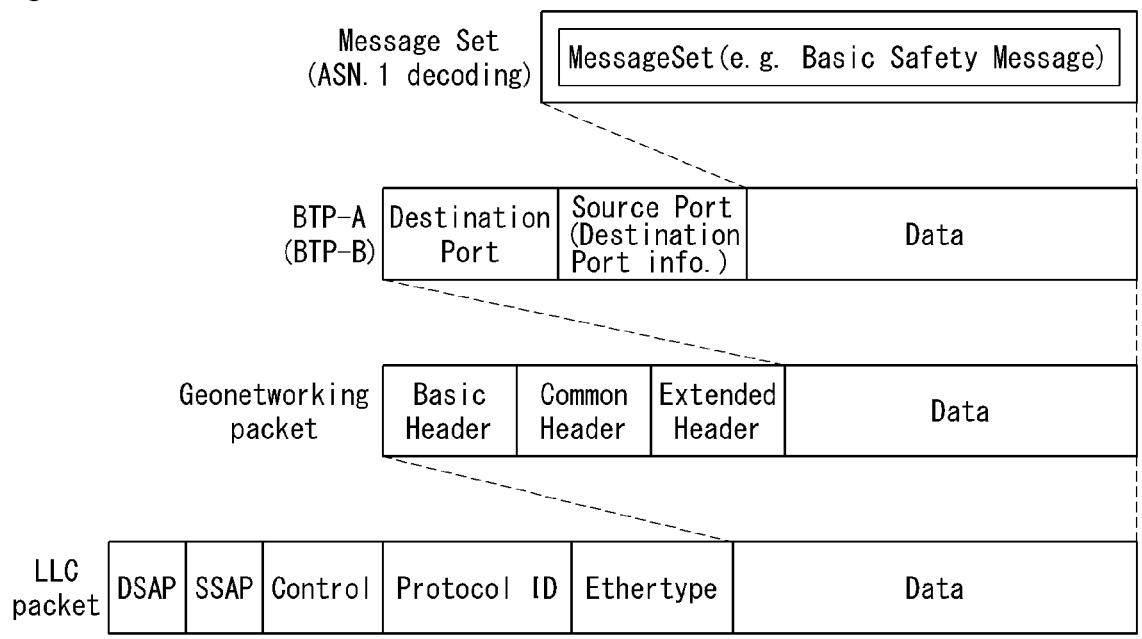
FIG. 2 illustrates a packet structure of a network/transport layer according to an embodiment of the present disclosure.

FIG. 2 illustrates a packet structure of a network/transport layer according to an embodiment of the present disclosure.

The transport layer may generate a BTP packet, and the network layer may generate a geo-networking packet. The geo-networking packet may be encapsulated into an LLC packet. In an embodiment of FIG. 2, the data may include a message set, and the message set may become a basic safety message.

The BTP is a protocol for transmitting the message such as the CAM or DENM generated by the facility layer to the lower layer. The BTP header includes A type and B type. The A type BTP header may include a destination port and a source port required for transmission/reception for interactive packet transmission. The B type BTP header may include the destination port and destination port information required for transmission for non-interactive packet transmission. The description of a field/information included in the header is as follows.

Destination port: The destination port identifies a facility entity corresponding to the destination of data (BTP-PDU) included in the BTP packet.

Source port: As a field generated in the case of BTP-A type, the Source port indicates a port of a protocol entity of the facility layer in a source in which the corresponding packet is transmitted. This field may have a size of 16 bits.

Destination port Information: As a field generated in the case of BTP-B type, the Destination port information may provide additional information when the destination port is a most well-known port. This field may have the size of 16 bits.

The geo-networking packet includes a basic header and a common header according to the protocol of the network layer and optionally includes an extension header according to a geo-networking mode. The geo-networking header will be described below again.

An LLC header is added to the geo-networking packet to generate the LLC packet. The LLC header provides a function to distinguish and transmit IP data from geo-networking data. The IP data and the geo-networking data may be distinguished by Ether-type of SNAP. As an embodiment, when the IP data is transmitted, the Ether-type may be set to 0x86DD and included in the LLC header. As an embodiment, when the geo-networking data is transmitted, the Ether-type may be set to 0x86DC and included in the LLC header. The receiver may verify the Ether-type field of the LLC packet header and forward and process the packet to an IP data path or a geo networking path according to the value.

FIG. 3 illustrates a header structure of a geo-networking packet according to an embodiment of the present disclosure.

FIG. 3(a) shows the basic header of the geo-networking packet header shown in FIG. 2, and FIG. 3(b) shows the common header of the geo-networking packet header shown in FIG. 2.

The basic header may be 32 bits (4 bytes). The basic header may include at least one of a version field, a next header (NH) field, a lifetime (LT) field, and a remaining hop limit (RHL) field. The description of the fields included in the basic header is as follows. A bit size configuring each field is just an embodiment and may be modified.

Version (4 bits): A version field indicates a version of the geo-networking protocol.

NH (4 bits): A next header (NH) field indicates a type of subsequent header/field. When a field value is 1, the common header may be followed and when the field value is 2, a secured packet in which the security is configured may be followed.

LT (8 bits): A lifetime (LT) field indicates a maximum survival time of the corresponding packet.

RHL (8 bits): A remaining hop limit (RHL) field indicates a remaining hop limit. An RHL field value may be reduced by one for each forwarding on a GeoAdhoc router. When the RHL field value is 0, the corresponding packet is not forwarded any longer.

The common header may be 64 bits (8 bytes). The common header may include at least one of a next header (NH) field, a header type (HT) field, a header sub-type (HST) field, a header sub-type (HST) field, a traffic class (TC) field, a flags field, a payload length (PL) field, and a maximum hop limit (MHL) field. The description of each of the fields is as follows.

NH (4 bits): The next header (NH) field indicates the type of subsequent header/field. When the field value is 0, the NH field may indicate "ANY" type which is not defined, when the field value is 1, the NH field may indicate a BTP-A type packet, when the field value is 2, the NH field may indicate a BTP-B type, and when the field value is 3, the NH field may indicate an IP diagram of IPv6.

HT (4 bits): The header type field indicates a geo-networking type. The geo-networking type includes Beacon, GeoUnicast, GeoAnycast, GeoBroadcast, Topologically-Scoped Broadcast (TSB), and Location Service (LS).

HST (4 bits): The header sub type field indicates a detailed type together with the header type. As an embodiment, when the HT type is set to the TSB, the HST may indicate a single hop for the HST value of '0' and a multi-hop for the HST value of '1'.

TC (8 bits): The traffic class field may include Store-Carry-Forward (SCF), channel offload, and TC ID. The SCF field indicates whether to store the packet when there is no neighbor to which the packet is to be transferred. The channel offload field indicates that the packet may be transferred to another channel in the case of a multi-channel operation. The TC ID field as a value allocated when transferring the packet in the facility layer may be used for setting a contention window value in the physical layer.

Flag (8 bits): The flag field indicates whether the ITS apparatus is mobile or stationary and as an embodiment, the flag field may become last 1 bit.

PL (8 bits): The payload length field indicates a data length subsequent to the geo-networking header in units of bytes. For example, in the case of the geo-networking packet that carries the CAM, the PL field may indicate the BTP header and the length of the CAM.

MHL (8 bits): The Maximum Hop Limit (MHL) field may indicate a maximum hopping number.

The geo-networking header includes the basic header, the common header and the extended header. A configuration of the extended header changes depending on a type of the geo-networking. Hereinafter, a header configuration depending on each type of the geo-networking will be described.

In the present disclosure, a V2X communication apparatus that performs the geo-networking may be referred to as a router or a GeoAdhoc router. A V2X communication apparatus that transmits a geo-networking packet may be referred to as a source router or a sender. A V2X communication apparatus that receives a geo-networking packet from the source router and relays/forwards it to the sender may be referred to as a forwarding router or a forwarder. In addition, a V2X communication apparatus, which is a final destination of the geo-networking packet or a V2X communication apparatus of a final destination region may be referred to as a destination or a destination router.

FIG. 4 illustrates a geo-networking type and a header configuration thereof according to an embodiment of the present disclosure.

FIG. 4(a) shows a data forwarding method of Geographically-Scoped Unicast (GUC) type, and FIG. 4(b) shows a GUC header configuration.

GUC is a method for forwarding data from a specific source router to a destination router. As shown in FIG. 4(a), a source router S may transmit data to a destination router N8 with GUC type via a multi-hop. The source router needs to have information of the destination router in a location table. In the case that there is no information of the destination router, the source router may find a desired destination by using "LS request and LS reply" process.

In FIG. 4(b), a GUC packet header includes a basic header, a common header and an extended header. HT field of the common header indicates GUC, and the extended header includes SN field, Source Position Vector (SO PV)

field and Destination Position Vector (DE PV) field. The description for the fields included is as below.

Sequence Number (SN): A Sequence Number field indicates a value used for examining a packet redundancy. A value of the Sequence Number field is increased by 1 when a source transmits a packet. A reception router may use a sequence number (or sequence number and TST value) and may determine whether a packet is redundantly received. The SN is a value used in multi-hop transmission.

SO PV: A SO PV represents a position of source and may be a long position vector format.

DE PV: A DE PV represents a position of destination and may be a short position vector format.

FIG. 5 illustrates a geo-networking type and a header configuration thereof according to another embodiment of the present disclosure.

FIG. 5(a) shows a data forwarding method of Topologically Scoped Broadcast (TSB) type, and FIG. 5(b) shows a TSB header configuration.

TSB is a broadcast scheme in which a distance that data is forwarded is adjusted by the number of hops. Information based on a position is not used. Since it is determined whether to forward data only with the number of hops, a position address of a destination or local information to which data is forwarded is not used. Data may be forwarded to all routers within n hops from the source router S.

FIG. 5(a) shows a data transmission of TSB scheme of n=2. The source router may broadcast a signal by setting n=2, and the routers within a transmission range of the source router receive the signal. Since n=2, forwarding routers N1, N2 and N3 that receive data with 1 hop re-broadcast the reception packet. Since N=2, the routers that receive the re-broadcasted signal do not re-broadcast the reception packet. In the TSB transmission method, the case of a single hop (n=1) may be referred to Single Hop Broadcast (SHB).

In FIG. 5(b), a TSB packet header includes a basic header, a common header and an extended header. HT field of the common header indicates TSB, and the extended header includes SN field and Source Position Vector (SO PV) field. The description for the fields included is as below.

Sequence Number (SN): A Sequence Number field indicates a value used for examining a packet redundancy. A value of the Sequence Number field is increased by 1 when a source transmits a packet. A reception router may use a sequence number (or sequence number and TST value) and may determine whether a packet is redundantly received. The SN is a value used in multi-hop transmission.

SO PV: A SO PV represents a position of source and may be a long position vector format.

In the case of the TSB header, since a transmission count is limited by the number of hops, a destination address may be omitted.

FIG. 6 illustrates a geo-networking type and a header configuration thereof according to another embodiment of the present disclosure.

FIG. 6(a) shows a data forwarding method of Single Hop Broadcast (SHB) type, and FIG. 6(b) shows a SHB header configuration.

SHB corresponds to the case that the number of hops is 1 (n=1) in the TSB described above. A SHB packet is transmitted only to the router within a transmission range of a source router. Since data may be transmitted with the smallest latency, SHB may be used for a safety massage transmission such as CAM. As shown in FIG. 6(a), a packet is transmitted only to the routers N1, N2 and N3 within the range of 1 hop of the source S.

In FIG. 6(b), a SHB packet header includes a basic header, a common header and an extended header. HT field of the common header indicates TSB, and the extended header includes Source Position Vector (SO PV) field. The description for the field included is as below.

SO PV: A SO PV represents a position of source and may be a long position vector format.

In the case of the SHB packet, since a transmission count is limited by the number of hops, a destination address may be omitted. Since transmission is not performed in multi-hop, an SN field for redundancy examination may also be omitted.

FIG. 7 illustrates a geo-networking type and a header configuration thereof according to another embodiment of the present disclosure.

FIG. 7(a) shows a data forwarding method of Geographically-Scope Broadcast (GBC)/Geographically-Scoped Anycast (GAC) type, and FIG. 4(b) shows a GBC/GAC header configuration.

GeoBroadcast/GBC is a transmission scheme that broadcasts packets to all routers of a specific region, and GeoAnycast/GAC is a transmission scheme that broadcasts packets to only one router that receives a first packet in a specific region. In GBC, when data transferred from a source router is transferred to a specific destination region, a packet is broadcasted within a predetermined region. In GAC, when a packet is transferred to one router in a specific destination region, the packet is not transferred any more.

In FIG. 7(b), a GBC/GAC header includes a basic header, a common header and an extended header. HT field of the common header indicates GBC or GAC, and the extended header includes SN field, Source Position Vector (SO PV) field and destination region information. The destination region information includes an altitude (GeoAreaPosLatitude) field of a center of the destination region, a longitude (GeoAreaPosLongitude) field, distance fields (Distance a, b) for informing a range of the region and an angle field.

Sequence Number (SN): A Sequence Number field indicates a value used for examining a packet redundancy. A value of the Sequence Number field is increased by 1 when a source transmits a packet. A reception router may use a sequence number (or sequence number and TST value) and may determine whether a packet is redundantly received. The SN is a value used in multi-hop transmission.

SO PV: A SO PV represents a position of source and may be a long position vector format.

DE PV: A DE PV represents a position of destination and may be a short position vector format.

Figure 8:
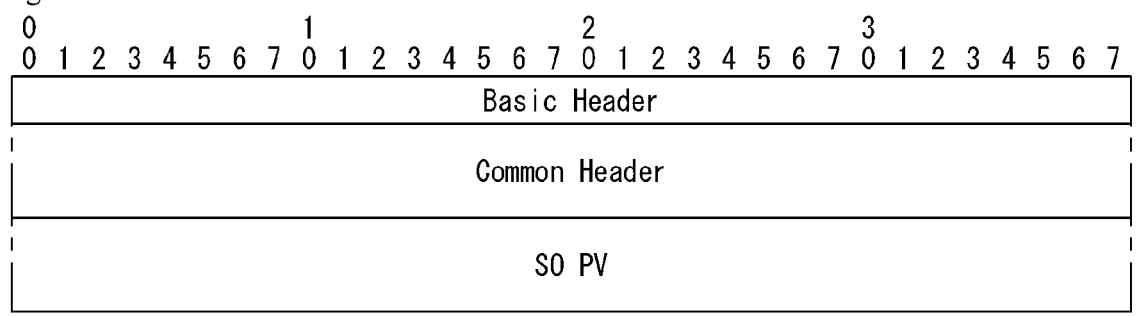
FIG. 8 illustrates a geo-networking type and a header configuration thereof according to another embodiment of the present disclosure.

FIG. 8 illustrates a geo-networking type and a header configuration thereof according to another embodiment of the present disclosure.

FIG. 8 shows a header configuration of a beacon packet. The beacon packet header may include a basic header, a common header and an extended header, and the extended header includes SO PV information.

The beacon packet may be configured with the similar manner with the SHB packet header described above. The difference is that a message may be added behind of the SHB packet, and the SHB packet is used for forwarding data such as CAM, but data is not added to the beacon packet, and the beacon packet itself is used. The CAM or beacon that uses the SHB may be transmitted periodically. By transmitting and receiving the CAM or beacon, a router may obtain position information of neighboring routers and perform routing using the position information. As an embodiment, when the CAM is transmitted, the beacon may not be transmitted.

FIG. 9 illustrates a configuration of Location Service (LS) request and LS reply type packets according to an embodiment of the present disclosure.

FIG. 9(a) shows a LS request packet header, and FIG. 9(b) shows a LS reply packet header.

In the case that there is no destination information in its own location table, a source router may request geo-networking address information (GN_ADDR) for a destination to neighbors. Such an address information request may be performed such that the LS request packet transmits the LS request information (LS_request). In the case that the information requested by the source router is included in the location table of the router that receives the LS request packet, the router may transmit LS reply information (LS_reply). In addition, the router in the destination may transmit LS reply information in response to the LS request information.

The LS reply information includes position vector information of GN_ADDR. The source router may update the location table through the LS reply information. The source router may perform a GUC transmission by using the geo-networking address information which is received in response.

In FIG. 9(a), a configuration of the LS request packet header is similar to the GUC header. In the LS request packet header, a geo-networking address request field (RequestGN_ADDR) is included, instead of the destination address field of the GUC header.

In FIG. 9(b), a configuration of the LS reply packet header is the same as the GUC packet header. However, the SO PV field includes position vector information of the router, and the DE PV field includes position vector information of the router that transmits the request.

FIG. 10 illustrates position vector information according to an embodiment of the present disclosure.

As described above, the geo-networking packet header includes a position vector (PV) field which is related to a position. A type of the position vector includes a long PV and a short PV. FIG. 10(a) shows long position vector information, and FIG. 10(b) shows short position vector information.

As shown in FIG. 10(a), the long position vector information includes subfields as follows.

GN_ADDR: The geo-networking address field may be configured with total 64 bits. The GeoAdhoc router that performs geo-networking transmission has a single unique geo-networking address value. The geo-networking address field may include subfields as follows.

a) M: A field for distinguishing between the geo-networking address or a manually configured value. As an embodiment, when the value is '1', M may be a manually configured value.

b) ST: ITS-S type field indicates a type of the ITS station. The ITS-S type may include a pedestrian, a cyclist, a moped, a motorcycle, a passenger car, a bus, a light truck, a heavy truck, a trailer, a special vehicle, a tram and an RSU.

c) MID: As V2X apparatus identification information, a MAC address may be used.

TimeSTamp (TST): The time stamp field indicates a time when the ITS station obtains altitude/longitude in the GeoAdhoc router. As a millisecond unit, Universal Time Coordinated (UTC) value may be used.

Latitude (LAT), Longitude (Long): The latitude field and the longitude field indicate an altitude value and a longitude value of a GeoAdhoc router.

Position Accuracy Indicator (PAI): This field indicates an accuracy of a GeoAdhoc router position.

Speed (S): This field indicates a speed of a GeoAdhoc router.

Heading (H): This field indicates a direction of a GeoAdhoc router.

As shown in FIG. 10(b), the shot position vector information includes the GN_ADDR field, the TST field, the LAT field and the Long field. The description for each field is as described above for the long position vector.

Various packet forwarding methods may be used for a geo-networking transmission. For example, greedy forwarding algorithm, contention-based forwarding algorithm, non-area contention-based forwarding algorithm, area contention-based forwarding algorithm and area advanced forwarding algorithm may be used. The forwarding algorithm is used for transferring and distributing data to an objected area efficiently. In the case of the greedy forwarding algorithm, the source router determines a forwarding router, and in the case of the contention-based forwarding algorithm, the reception router determines whether to forward a packet by using contention. That is, when a timer expires, the reception router determines itself as a forwarder and transmits a packet. However, when the reception router receives the same packet until a timer expires, the reception router determines itself not to be a forwarder and discard the packet. Hereinafter, the non-area contention-based forwarding algorithm is described.

Figure 11:
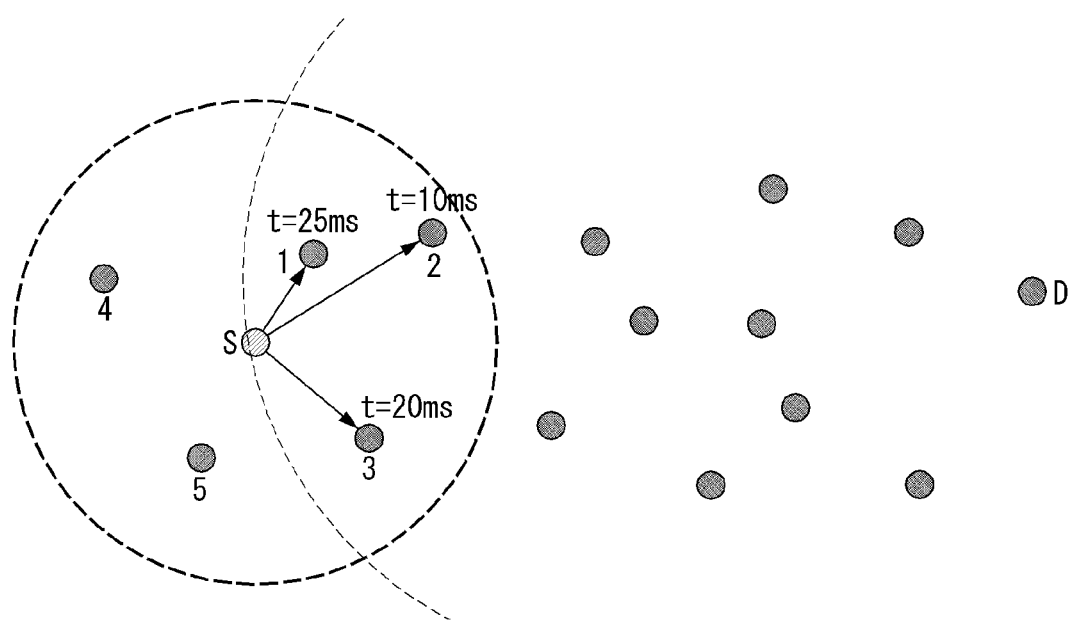
FIG. 11 illustrates a packet forwarding method of the non-area contention-based algorithm according to an embodiment of the present disclosure.

FIG. 11 illustrates a packet forwarding method of the non-area contention-based algorithm according to an embodiment of the present disclosure.

The non-area contention-based algorithm is used for forwarding a packet in a destination direction. In FIG. 11, a source router S may broadcast a packet for a packet transmission. Routers 1 to 5 in the communication range of the source router receive the packet. Among the routers, only the router which is the closest to the destination may be a forwarder candidate. In FIG. 11, routers 1 to 3 may become forwarder candidates.

The forwarder candidates may store a reception packet in Contention-based Forwarding (CBF) packet buffer and set a timer. The timer may be set as a smaller value as a distance from the source increases. In FIG. 11, the timer of router 1 may be set as 25 ms, the timer of router 2 may be set as 10 ms, and the timer of router 3 may be set as 20 ms. The timer of which timer expires broadcasts the buffered packet.

In FIG. 11, router 2 which timer expires first broadcasts a packet. Router 1 and router 3 that receive the packet broadcasted by router 2 stop their own timers and delete packets stored in the buffer. However, in the case that router 2 disappears or router 1 and router 3 are not present in the communication coverage of router 2, the timers of router 1 and router 3 are still valid, and accordingly, the router of which timer becomes zero broadcasts a packet.

Figure 12:
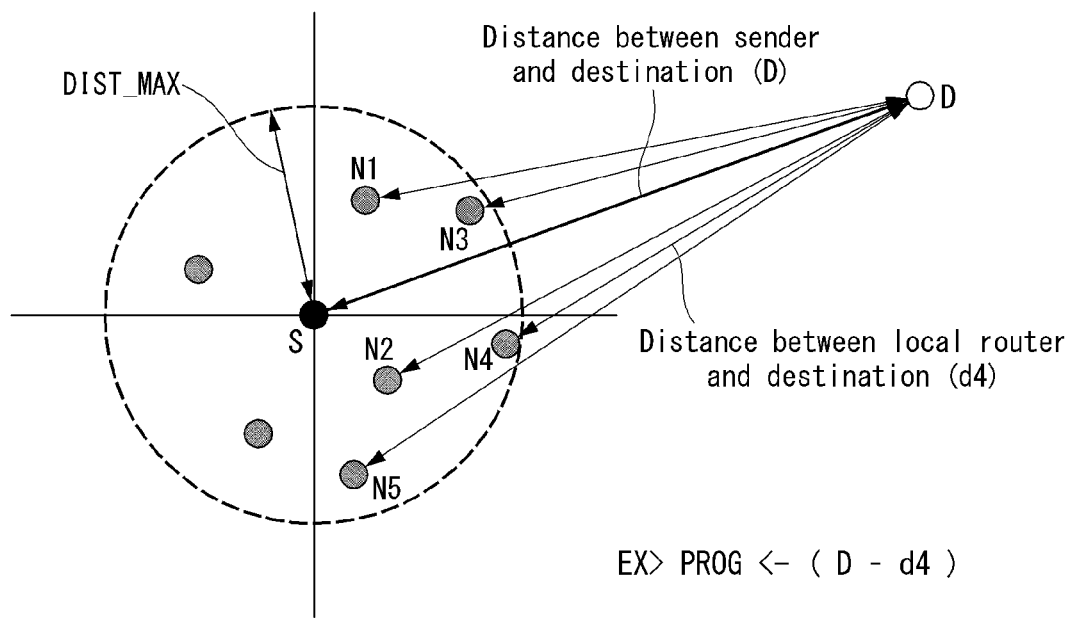
FIG. 12 is a conceptual diagram of the non-area contention-based algorithm according to an embodiment of the present disclosure.

FIG. 12 is a conceptual diagram of the non-area contention-based algorithm according to an embodiment of the present disclosure.

The contention-based algorithm is an algorithm that a sender does not determine a next hop, but rather a receiver determines a next forwarder through a contention. The sender broadcasts a geo-networking (GN) packet, and all neighboring routers that receive the GN packet store the packet in CBF buffer and start timers. An operation of the timer is as represented in Equation 1 below.

$$TO\_CBF = \begin{cases} TO\_CBF\_MAX + \\ TO\_CBF\_MIN - & \text{for } PROG \leq \\ \dfrac{TO\_CBF\_MAX}{DIST\_MAX} \times PROG & DIST\_MAX \\ TO\_CBF\_MIN & \text{for } PROG > \\ & DIST\_MAX \end{cases} \quad [\text{Equation 1}]$$

TO_CBF: Timeout for CBF buffering packet

TO_CBF_MIN: A minimum duration for which a packet is buffered in CBF packet buffer TO_CBF_MAX: A maximum duration for which a packet is buffered in CBF packet buffer PROG: A difference between a destination and a sender and a local distance between a destination and an Adhoc router. That is, a difference between D and d4 in FIG. 12.

DIST_MAX: A theoretical maximum communication range of a radio access technology, as an embodiment, this value may be determined by the specification that describes the ITS access technology or determined by 'itsGnDefaultMaxCommunicationRange' of the GN protocol.

In Equation 1, the case of PROGDIST_MAX represents a case that a packet is forwarded to a router in the maximum communication range. And a value of TO_CBF_MIN-TO_CBF_MAX becomes a negative number for all cases. Accordingly, as PROG/DIST_MAX value increases, a buffering time decreases. DIST_MAX may be a preconfigured fixed value, and consequently, as PROG value increases, a packet is buffered in shorter time duration, and accordingly, the packet may be re-broadcasted more quickly. In other words, the router of which PROG is small and closest to the destination retransmits a packet the most quickly.

In Equation 1, the case of PRFG>DIST_MAX represents a case that a packet is forwarded to a router outside of the maximum communication range. In the case that a router is not in a transmission range of a sender, the router may retransmit a packet after buffering for minimum time. The fact that a router is not in a transmission range of a sender means that information for the sender is not stored in a location table of the router.

In the case of GeoBroadcast, GeoAnycast and GeoUnicast packets assuming multi-hop in the geo-networking, an extended header includes a PV of a source router and a PV of a destination and does not include a PV of a forwarding router. A router that receives a packet may identify a location of the forwarding router that forwards a packet through GN_ADDR that corresponds to MID stored in its own Location Table (LocT). In transmission, a geo-networking packet of a network layer is forwarded to a link layer, and the link layer adds a MAC ID (MID) of a source and a destination. The link layer packet configuration is shown in FIG. 2. A source MID may be the MID of a sender router, and a destination MID may be 'Broadcast' in the CBF. In a Destination Service Access Point (DSAP) of LLC header, a packet is forwarded to a neighboring router in broadcast type, and a MID of the sender is transmitted to a Source Destination, Service Access Point (SSAP). That is, in order to use the non-area contention-based forwarding algorithm, information of neighboring routers needs to be stored in a location table through a beacon or a SHB.

Figure 13:
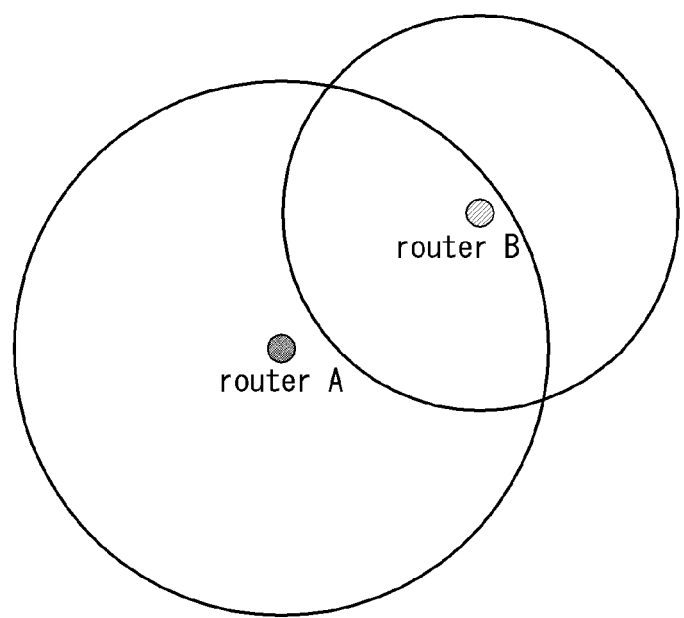
FIG. 13 illustrates a transmission range of routers in the CBF algorithm according to an embodiment of the present disclosure.

FIG. 13 illustrates a transmission range of routers in the CBF algorithm according to an embodiment of the present disclosure.

A router that receives a packet may use a MID of a link layer and obtain a PV of a sender in its own LocT. However, as shown in FIG. 13, a transmission range of router A that transmits a packet and a transmission range of router B that receives a packet may be different. In FIG. 13, in the case that an address corresponding to a MID of router A is not present in the LocT of router B, router B may determine that router B itself is out of the transmission range of router A and retransmit a packet after buffering during the minimum duration.

Since router A identifies the location of router B, when router A receives a packet from router B, router A may calculate a PROG value and calculate a timeout time based on the PROG value. However, in the case that router B receives a packet from router A, since the location of router A is not stored in the LocT of router B, router B broadcasts a packet after buffering the packet during as much as TO_CBF_MIN duration. When the packet stored in a CBF buffer is broadcasted, neighboring routers may identify that a reception packet is the same as the packet stored in its own CBF buffer. When the packets are identical, the neighboring routers may stop a timer and delete the packet.

FIG. 14 illustrates a pseudo-code of the CBF algorithm according to an embodiment of the present disclosure.

In the pseudo-code of the present disclosure, definitions of elements are as below.

P: A GN packet to be forwarded

EPV: Ego position vector

PV_P: A destination position vector included in a geo-networking packet

PV_SE: A sender position vector in a LocT having a position accuracy indicator PAI SE B: CBF packet buffer TO: Timeout for triggering re-broadcast of a packet NH_LL_ADDR: Link Layer (LL) address of a next hop BOAST: Broadcast LL address The description for an operation of the CBF algorithm represented in the pseudo-code of FIG. 14 is as follows.

In lines 10 to 13, in a CBF transmission, the link layer address of a next hop may be set to 'Broadcast'.

In lines 14 to 18, in the case that a reception packet is already stored in a buffer, a router may delete the packet in the buffer and stop a timer. The router discards the reception packet.

In lines 20 to 21, the PROG value indicates that a position vector of a sender is present in a LocT or a sender is a source router, the router calculates a PROG value that indicates a distance between the sender or the source router and a destination.

In lines 22 to 26, in the case that the PROG value is a positive number, the router buffers a packet and set a timer. Based on the PROG value, the router determines whether to progress forwarding.

In lines 27 to 30, in the case that the PROG value is a negative number, the router delete a packet. The case that the PROG value is a positive number represents that the reception router is closer to a destination than the source router, and the case that PROG value is a negative number represents that the reception router is farther to a destination than the source router In lines 31 to 35, in the case that a position vector of the sender is not present in a LocT, the router buffers a packet during the maximum duration. That is, in the case that there is no neighboring router to forward a packet, the router may transmit the packet after buffering the packet during the maximum duration and increase a transmission probability, which corresponds to the case that a router becomes present around.

In lines 38 to 41, when the timer expires, the router broadcast the packet stored in the buffer.

Figure 15:
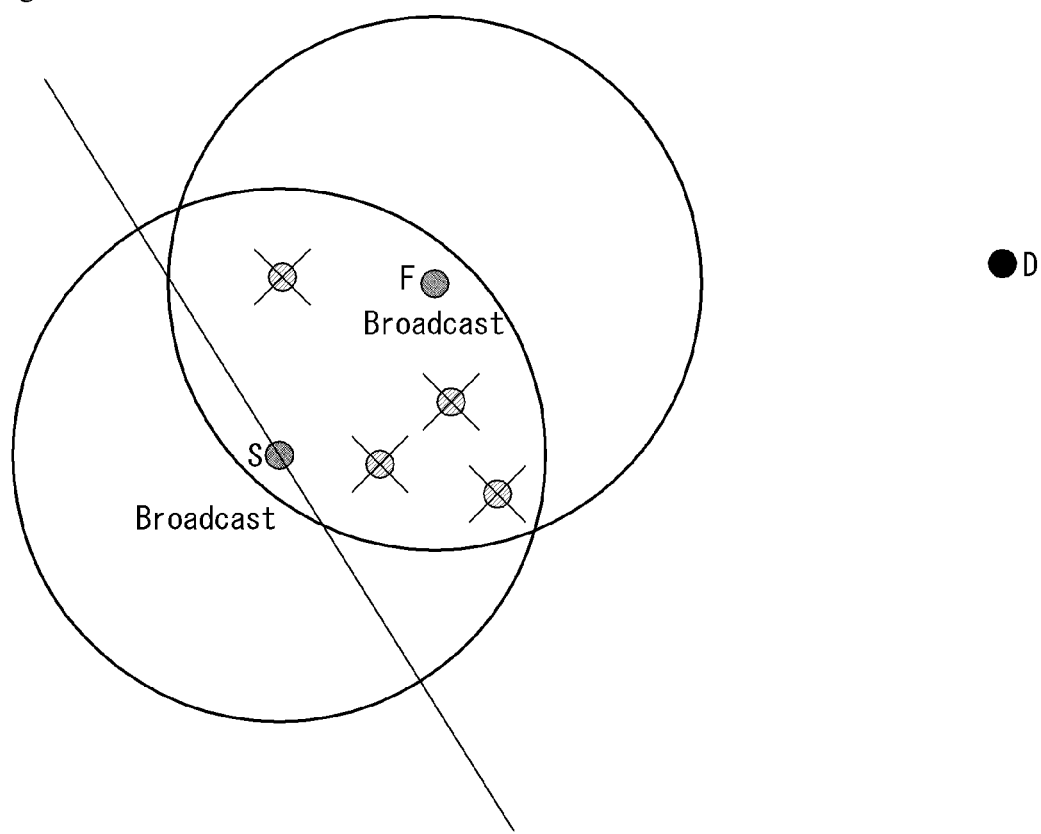
FIG. 15 illustrates operations of routers that implement the contention-based forwarding (CBF) algorithm according to an embodiment of the present disclosure.

FIG. 15 illustrates operations of routers that implement the contention-based forwarding (CBF) algorithm according to an embodiment of the present disclosure.

The CBF algorithm is an algorithm of which latency time is greater than that of greedy forwarding algorithm, but reliability is guaranteed. In the case that the CBF algorithm is used, operations of routers may be implemented as shown in FIG. 15.

In FIG. 15, a packet that a sender router S broadcasts is transmitted to all routers in the transmission range of the router S and stored in each CBF buffer. The routers start respective timers. Since a router F is the closest to a destination D, the timer of the router F expires first. The router F broadcasts the packet which is firstly buffered, and the other routers in the communication range of the router F receive the packet. In FIG. 15, the routers that already receive and buffer the packet from the router F stop the timers immediately and delete and discard the packet since the packet received from router F is the same as the buffered packet.

Since the CBF algorithm is operated based on timeout and broadcasting, in a dynamic communication environment, even in the case that a distance between a sender and a forwarder changes, a packet may be forwarded seamlessly. In the case of the greedy algorithm, when the router F which is determines as a forwarder in FIG. 15 goes out of the communication range, a transmission path is lost, and a packet forwarding becomes impossible. In the case of the CBF algorithm, even though the router F goes out of the communication range, another router which is closest to a destination in the communication range may become a forwarder and forward a packet.

FIG. 16 illustrates operations of routers that implement the contention-based forwarding (CBF) algorithm according to another embodiment of the present disclosure.

FIG. 16(a) shows an example of a redundant transmission possibility of the CBF algorithm, and FIG. 16(b) shows an example that the same packet is transmitted in an overlapped path.

The CBF algorithm is highly reliable but may cause a channel load. In FIG. 16(a), since the communication ranges of routers that receive a CBF packet are not overlapped, the same packet may be transmitted via different paths. In FIG. 16(a), the packet transmitted by a sender router S is received by a router CF1, a router CF2 and a router CF3. Since the router CF2 is the closest to the destination, the timer of the router CF2 expires first and the router CF2 re-broadcasts the packet. However, since the router CF1 and the router CF3 are present out of the communication range of the router CF2, the router CF1 and the router CF3 are unable to identify broadcasting of the router CF2. Since the communication distances are not overlapped between the router CF1 and the router CF3, after timeout time, the router CF1 and the router CF3 broadcast the packet, respectively. As shown in FIG. 16(b), the same packet may be transmitted with multiple paths through a plurality of routers. Consequently, since the same packet is forwarded to a channel via unrequired path, the channel use efficiency decreases.

As an embodiment, in the case that a packet arrives at a destination via several paths, a destination router may search an overlapped packet by using time stamp information or sequence number information and delete a packet that arrives lately. Even in this case, the packet is available to be deleted when the same packets arrive at a single router, it is hard to prevent the same packets are transmitted to a channel. Hereinafter, it is described the non-area contention-based forwarding algorithm for preventing the overlapped path transmission.

Figure 17:
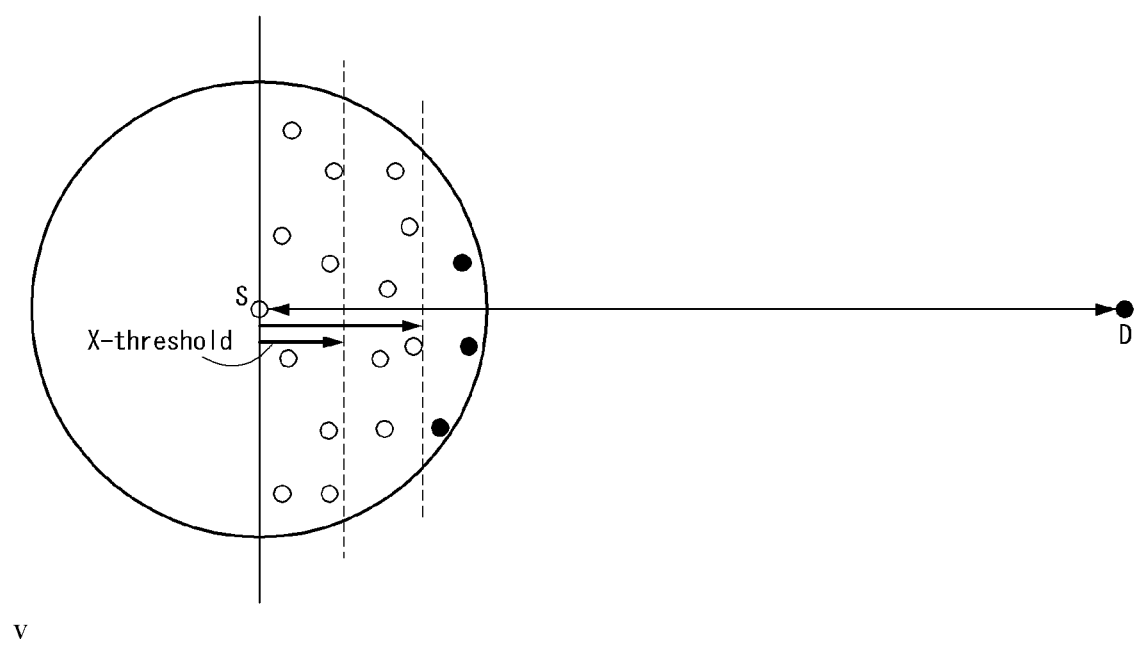
FIG. 17 illustrates a method of limiting a valid transmission area by limiting a valid transmission distance between a sender and a destination as the CBF algorithm according to an embodiment of the present disclosure.

FIG. 17 illustrates a method of limiting a valid transmission area by limiting a valid transmission distance between a sender and a destination as the CBF algorithm according to an embodiment of the present disclosure.

In FIG. 17, the dark points show candidate forwarder routers in the case of limiting a valid transmission distance between a sender and a destination. When a source router S broadcasts a packet, all routers in a semi-circle area of a destination direction may receive the packet. In the embodiment of FIG. 17, the routers that are not belonged to a valid transmission area do not operate a timer, but only the routers (dark points) that are belonged to the valid transmission area operate a timer.

In FIG. 17, the valid transmission area is an area outside of a specific distance in the sender direction in a transmission range. The specific distance is denoted by X-threshold. The X-threshold is a threshold value in the destination direction between the sender and the destination and may become a value which is greater than 0 and smaller than a maximum transmission distance. The X-threshold may also be referred to as X-axis threshold distance.

The sender may transmit a packet with a distance to the valid transmission area. For this, the source router S may use position information for neighboring routers that receive it with a beacon or SHB. In the embodiment of FIG. 17, a plurality of routers may become forwarder candidates, and the routers that receive a packet may broadcast the packet when a timer expires even in the case that the routers move out of the communication distance of the source router. Among the forwarder candidates, when a router broadcasts a packet, the other routers that receive the packet may not forward the packet. The routers out of the valid transmission area may delete/discard the reception packet immediately.

FIG. 18 illustrates a pseudo-code of the CBF algorithm according to the embodiment of FIG. 17.

With respect to FIG. 18, the same description as the contents described above in the pseudo-code is not repeated. In FIG. 18, X-th is the X-threshold described above and a threshold distance in the destination direction in the communication range.

In line 23, the router buffers a packet only in the case that PROG is greater than the X-th and set a timer. The routers of which PROG is smaller than the X-th discard the reception packet.

Figure 19:
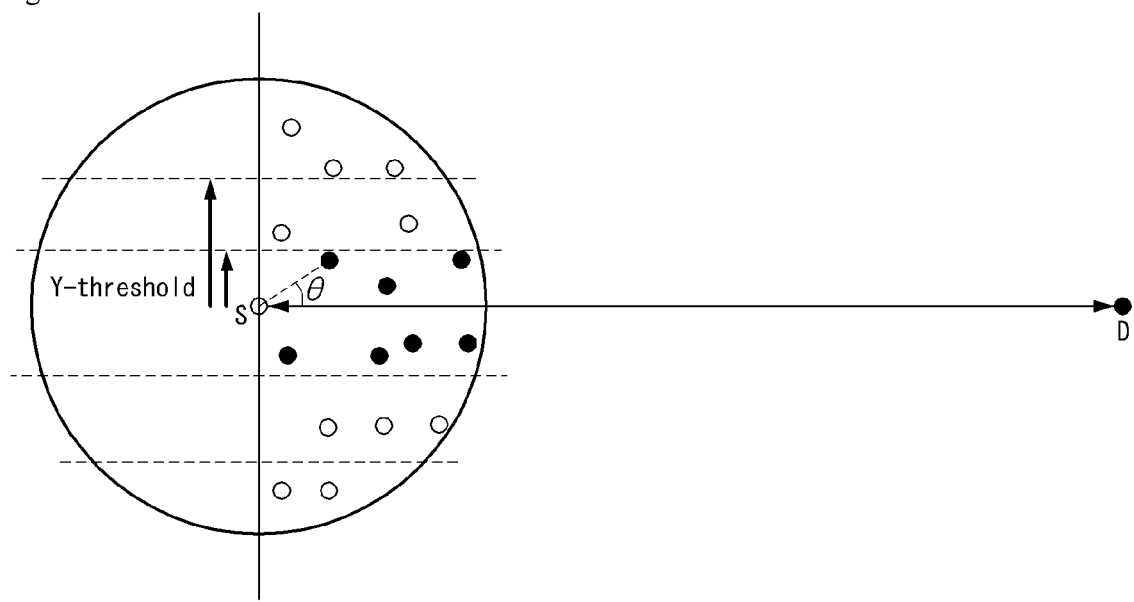
FIG. 19 illustrates a method for limiting a valid transmission area by limiting a valid transmission distance between a sender and a destination as the CBF algorithm according to an embodiment of the present disclosure.

FIG. 19 illustrates a method for limiting a valid transmission area by limiting a valid transmission distance between a sender and a destination as the CBF algorithm according to an embodiment of the present disclosure.

In FIG. 19, the dark points show candidate forwarder routers in the case of limiting a valid transmission width between a sender and a destination. When a source router S broadcasts a packet, all routers in a semi-circle area of a destination direction may receive the packet. In the embodiment of FIG. 19, the routers that are not belonged to the valid transmission width do not operate a timer, but only the routers (dark points) that are belonged to the valid transmission area operate a timer.

In FIG. 19, the valid transmission width may be determined by Y-threshold. Assuming that the axis connecting the sender and the destination is X-axis, the axis which is perpendicular to X-axis may be assumed to be Y-axis. In the embodiment of FIG. 19, the valid area may be limited by Y-axis, and only the routers in the area may become a candidate forwarder. A value of Y-axis that limits the valid area is defined as Y-threshold. The Y-threshold may also be referred to as Y-axis threshold distance.

In order to determine that a candidate router is located within a Y-threshold range, a packet reception router needs to calculate a vertical distance in the source and destination directions. In order to calculate the vertical distance, the router needs to obtain an angle θ between a line connecting the router itself EPV and the sender PV_SE and a line connecting the sender PV_SE and the destination PV_P. In the case that sin θ value of the angle is within the Y-threshold range, the router may determine the router itself as a valid forwarder.

The distance to the valid transmission area may be transmit with being included in a packet. For this, the source router S may use position information for neighboring routers that receive it with a beacon or SHB. In the embodiment of FIG. 19, a plurality of routers may become forwarder candidates, and the routers that receive a packet may broadcast the packet when a timer expires even in the case that the routers move out of the communication distance of the source router. Among the forwarder candidates, when a router broadcasts a packet, the other routers that receive the packet may not forward the packet. The routers out of the valid transmission area may delete/discard the reception packet immediately.

The forwarder candidate router that receives the packet may calculate an angle between a vector connecting its own position EPV and a vector connecting the sender router position PV_SE and the destination position PV_P. The angle between two vectors may be calculated by using Equation 2 and Equation 3 below.

$$\overline{a} \cdot \overline{b} = |a||b|\cos\theta \quad \text{[Equation 2]}$$

$$\theta = \arccos\left(\frac{\overline{a} \cdot \overline{b}}{|a||b|}\right) \quad \text{[Equation 3]}$$

Using Equation 3, an angle between sender-destination and sender-ego router may be calculated by using Equation 4.

$$\text{ANGLE}(EPV, PV\_SE, PV\_P) = \quad \text{[Equation 4]}$$
$$\arccos\frac{(PV\_SE - EPV) \cdot (PV\_P - EPV)}{|PV\_SE - EPV| \cdot |PV\_P - EPV|}$$

When the angle between two vectors is calculated, based on sin formula of trigonometrical function, the Y-axis distance of the ego router may be calculated. The Y-axis value becomes a value of multiplying sin θ to the distance vector between the sender and the ego router. The ego router means a forwarding candidate router that may become a forwarder.

FIG. 20 illustrates a pseudo-code of the CBF algorithm according to the embodiment of FIG. 19.

With respect to FIG. 20, the same description as the contents described above in the pseudo-code is not repeated. In FIG. 20, Y-th is the Y-threshold described above and represents a Y-axis direction threshold distance value of a forwarding router. The Y-threshold represents a threshold value of a direction perpendicular to the sender-destination direction. Y-DIST represents a distance from a line between the sender-destination to the ego router. Y-DIST may represent a vertical direction distance from the line between the sender-destination to the ego router, that is, Y-axis distance. θ represents an angle between the sender-ego router and the sender-destination.

In line 24, the router may use its own position vector information EPV, the position vector information PV_SE of the sender and the position vector information PV_P of the destination and calculate the angle as represented in Equation 4.

In line 25, the router may calculate the Y-axis distance Y-DIST.

In line 26, the router starts the forwarding process only in the case that the Y-axis distance is less than the Y-threshold and the PROG is greater than 0. That is, the router buffers a reception packet and starts a timer only in the case that the Y-axis distance is less than the Y-threshold and the PROG is greater than 0. In the case that the Y-axis distance is the Y-threshold or longer and the PROG is 0 or less, the router may discard the reception packet. The Y-threshold is determined in the sender and transmitted with being included in a packet.

Figure 21:
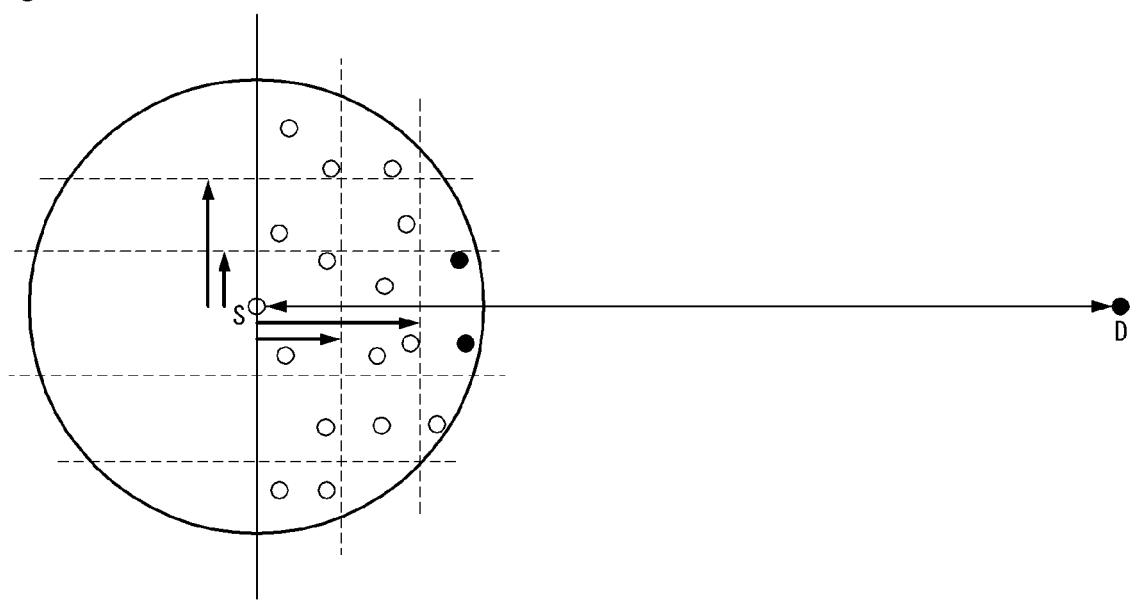
FIG. 21 illustrates a method of limiting a valid transmission area by limiting a valid transmission distance between a sender and a destination as the CBF algorithm according to an embodiment of the present disclosure.

FIG. 21 illustrates a method of limiting a valid transmission area by limiting a valid transmission distance between a sender and a destination as the CBF algorithm according to an embodiment of the present disclosure.

In FIG. 21, the dark points show candidate forwarder routers in the case of limiting a valid transmission distance and a valid transmission width between a sender and a destination. When a source router S broadcasts a packet, all routers in a semi-circle area of a destination direction may receive the packet. In the embodiment of FIG. 21, the routers that are not belonged to the valid transmission width do not operate a timer, but only the routers (dark points) that are belonged to the valid transmission area operate a timer.

FIG. 21 shows an embodiment of using the embodiments of FIGS. 17 and 18 and the embodiments of FIGS. 19 and 20. That is, only the routers that are apart from a predetermined distance in a destination direction X-axis and within a predetermined distance in Y-axis direction may be a forwarding router candidate of the CBF among the routers in a transmission range. The X-axis value and the Y-axis value for limiting the forwarding router may be the X-threshold and the Y-threshold described above. The threshold values may be transmitted with being included in a packet.

In FIG. 21, the dark points candidate forwarder routers in the case of limiting a valid transmission distance between a sender and a destination. The source router S may use position information for neighboring routers that receives with a beacon or SHB. The description overlapped with the embodiments of FIGS. 17 to 20 is not repeated.

FIG. 22 illustrates a pseudo-code of the CBF algorithm according to the embodiment of FIG. 21.

With respect to FIG. 22, the same description as the contents described above in the pseudo-code is not repeated. X-th is the X-threshold described above and represents a threshold distance in the destination direction in the communication range. Y-th is the Y-threshold described above and represents a threshold distance value of Y-axis direction of a forwarding router. Y-DIST represents a distance from a line between the sender-destination to the ego router. Y-DIST may represent a vertical direction distance from the line between the sender-destination to the ego router, that is, Y-axis distance. θ represents an angle between the sender-ego router and the sender-destination.

In line 24, the router may use its own position vector information EPV, the position vector information PV_SE of the sender and the position vector information PV_P of the destination and calculate the angle as represented in Equation 4.

In line 25, the router may calculate the Y-axis distance Y-DIST.

In line 26, the router starts the forwarding process only in the case that the PROG exceeds the X-threshold and the Y-axis distance is less than the Y-threshold. That is, the router buffers a reception packet and starts a timer only in the case that the Y-axis distance is less than the Y-threshold and the PROG is greater than X-threshold. In the case that the Y-axis distance is the Y-threshold or longer and the PROG is 0 or less, the router may discard the reception packet. The Y-threshold is determined in the sender and transmitted with being included in a packet.

Figure 23:
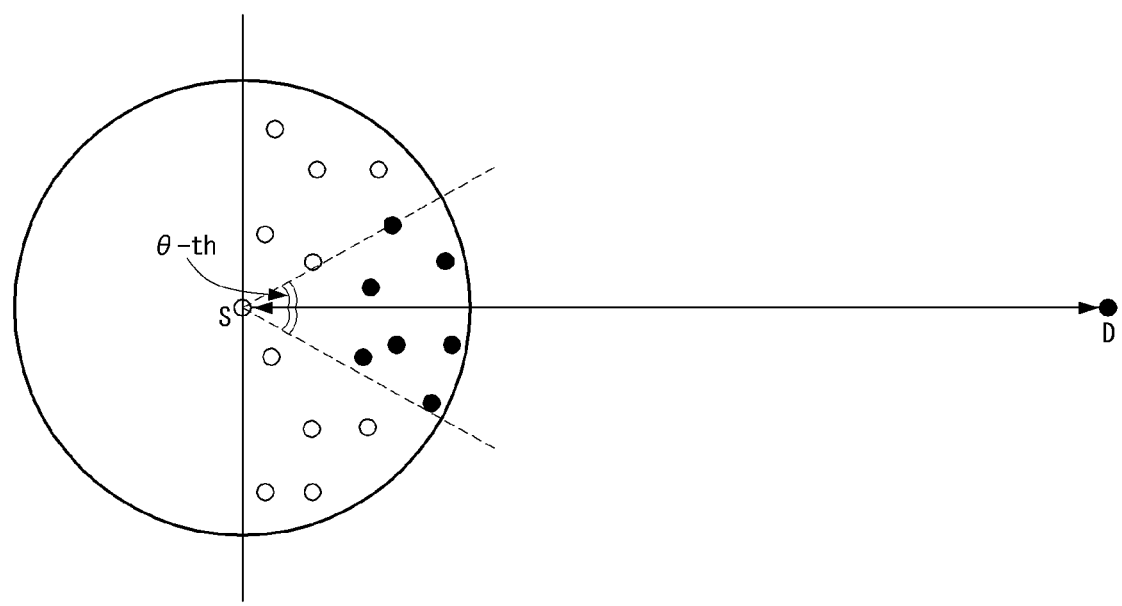
FIG. 23 illustrates a method of limiting a valid transmission area by limiting a valid transmission angle in a destination direction as the CBF algorithm according to an embodiment of the present disclosure.

FIG. 23 illustrates a method of limiting a valid transmission area by limiting a valid transmission angle in a destination direction as the CBF algorithm according to an embodiment of the present disclosure.

In FIG. 23, the dark points show candidate forwarder routers in the case of limiting a valid transmission angle in a destination direction. When a source router S broadcasts a packet, all routers in a semi-circle area of a destination direction may receive the packet. In the embodiment of FIG. 23, the routers that are not belonged to the valid transmission angle do not operate a timer, but only the routers (dark points) that are belonged to the valid transmission angle operate a timer.

In FIG. 23, the source router S may determine a threshold angle θ-th by referring to its own LocT. θ represents an angle between sender-destination and sender-ego router. An actual valid transmission area becomes an area within an angle of 2θ-th. In FIG. 23, the routers located in the area within the angle of 2θ-th in a destination direction from the source router become candidate forwarding routers. θ may be calculated by using Equation 4 in the embodiment of FIG. 19. In the case that the calculated angle θ is greater than −θ-th, which is a threshold angle, and smaller than +θ-th, the router may determine that the router itself is a router within the valid area.

FIG. 24 illustrates a pseudo-code of the CBF algorithm according to the embodiment of FIG. 23.

With respect to FIG. 24, the same description as the contents described above in the pseudo-code is not repeated. In FIG. 24, 8 represents an angle between the sender-ego router and the sender-destination. 8-th represents the valid transmission angle in a destination direction, that is, a threshold angle of the destination direction to determine the valid transmission area.

In line 23, the router may use its own position vector information EPV, the position vector information PV_SE of the sender and the position vector information PV_P of the destination and calculate the angle as represented in Equation 4.

In line 24, the router starts the forwarding process only in the case that the PROG is greater than 0 and a destination direction angle is smaller than an absolute value of the threshold angle. That is, the router buffers a reception packet and starts a timer only in the case that the Y-axis distance is less than the Y-threshold and the PROG is greater than 0. In the case that the Y-axis distance is the Y-threshold or longer and the PROG is 0 or less, the router may discard the reception packet. The Y-threshold may be determined in the sender and transmitted with being included in a packet.

Hereinafter, an information transmission method for applying the CBR algorithm described above is described.

FIG. 25 illustrates a transmission method of valid transmission area related information for applying the CBR algorithm according to an embodiment of the present disclosure.

FIG. 25 shows a method for transmitting information for limiting the transmission area of FIG. 17 to FIG. 24 described above, and particularly, a method for transmitting necessary information to a basic header of a geo-networking packet.

According to the embodiments of FIGS. 17 and 18, the valid transmission distance is limited by using the X-axis threshold distance. According to the embodiments of FIGS. 19 and 20, the valid transmission width is limited by using the Y-axis threshold distance. According to the embodiments of FIGS. 21 and 22, the valid transmission are is limited by using the X-axis threshold distance and the Y-axis threshold distance. According to the embodiments of FIGS. 23 and 24, the valid transmission area is limited by using the destination direction threshold angle. The X-axis threshold distance, the Y-axis threshold distance, the X-axis threshold distance/the Y-axis threshold distance and the destination direction angle may be referred to as threshold information for limiting the valid transmission area. The threshold information may include at least one of the X-axis threshold distance, the Y-axis threshold distance and the threshold angle.

FIG. 25 shows an embodiment of transmitting the threshold information with being included in a basic header. In FIG. 25, a position of the threshold information is just an embodiment and not limited to the position shown in FIG. 25.

In FIG. 25(a), the basic header includes the X-axis threshold distance (X-distance) information as the threshold information. The X-axis threshold distance information may be located behind of the NH field or the LT field as shown in FIG. 25(a).

In FIG. 25(b), the basic header includes the Y-axis threshold distance (Y-distance) information as the threshold information. The Y-axis threshold distance information may be located behind of the NH field or the LT field as shown in FIG. 25(b).

In FIG. 25(c), the basic header includes the X-axis threshold distance (X-distance) information and the Y-axis threshold distance (Y-distance) information as the threshold information. The Y X-axis threshold distance (X-distance) information and the Y-axis threshold distance (Y-distance) information may be located behind of the NH field or the LT field as shown in FIG. 25(c).

In FIG. 25(d), the basic header includes the destination direction angle (ANGLE) information as the threshold information. The angle information may be located behind of the NH field or the LT field as shown in FIG. 25(d).

Figure 26:
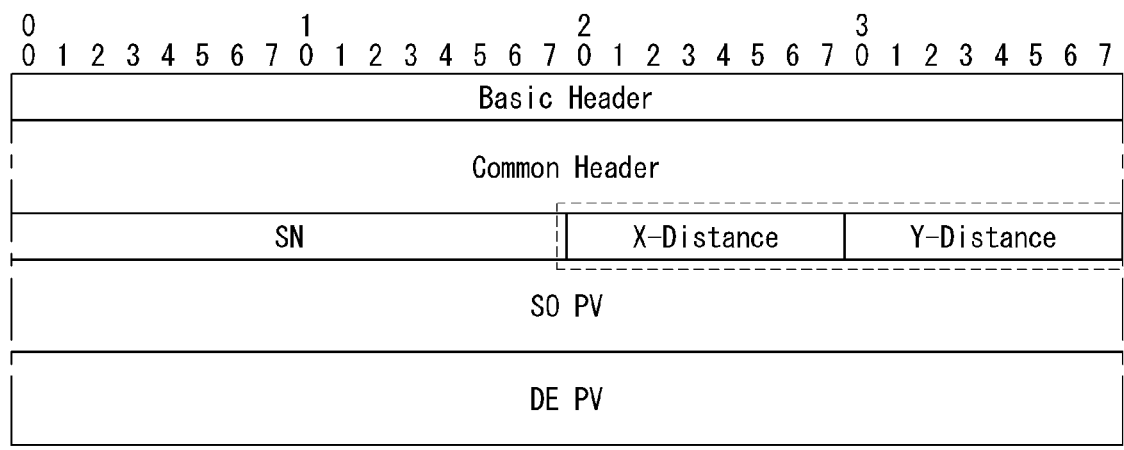
FIGS. 26 and 27 illustrate a transmission method of valid transmission area related information for applying the CBR algorithm according to an embodiment of the present disclosure.
Figure 27:
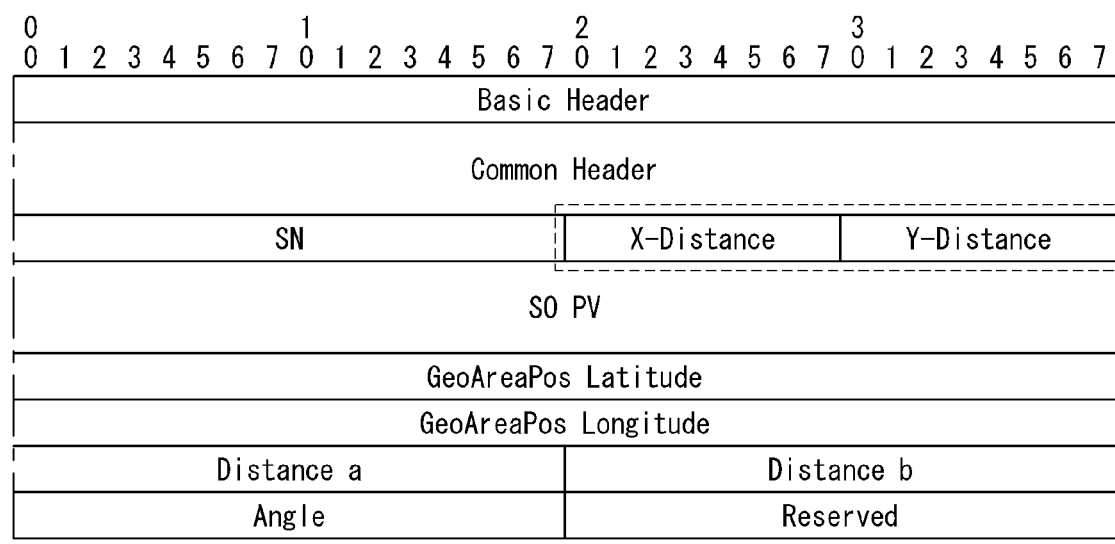

FIGS. 26 and 27 illustrate a transmission method of valid transmission area related information for applying the CBR algorithm according to an embodiment of the present disclosure.

FIGS. 26 and 27 show a method for transmitting information for limiting the transmission area of FIG. 17 to FIG. 24 described above, and particularly, a method for transmitting necessary information to a basic header of a geo-networking packet.

According to the embodiments of FIGS. 17 and 18, the valid transmission distance is limited by using the X-axis threshold distance. According to the embodiments of FIGS. 19 and 20, the valid transmission width is limited by using the Y-axis threshold distance. According to the embodiments of FIGS. 21 and 22, the valid transmission are is limited by using the X-axis threshold distance and the Y-axis threshold distance. According to the embodiments of FIGS. 23 and 24, the valid transmission area is limited by using the destination direction threshold angle. The X-axis threshold distance, the Y-axis threshold distance, the X-axis threshold distance/the Y-axis threshold distance and the destination direction angle may be referred to as threshold information for limiting the valid transmission area. The threshold information may include at least one of the X-axis threshold distance, the Y-axis threshold distance and the threshold angle. The threshold information including at least one of the X-axis threshold distance, the Y-axis threshold distance and the threshold angle may be included in the extended header of the geo-networking packet header.

FIG. 26 shows an embodiment of transmitting the threshold information with being included in a GUC header. In FIG. 26, a position of the threshold information is just an embodiment and not limited to the position shown in FIG. 26.

In FIG. 26, the GUC header includes the X-axis threshold distance (X-distance) information and the Y-axis threshold distance (Y-distance) information as the threshold information. The threshold information may be included in the extended header of the GUC header.

FIG. 27 shows an embodiment of transmitting the threshold information with being included in GBC/GAC header. In FIG. 27, a position of the threshold information is just an embodiment and not limited to the position shown in FIG. 27.

In FIG. 27, the GBC/GAC header includes the X-axis threshold distance (X-distance) information and the Y-axis threshold distance (Y-distance) information as the threshold information. The threshold information may be included in the extended header of the GUC header.

Figure 28:
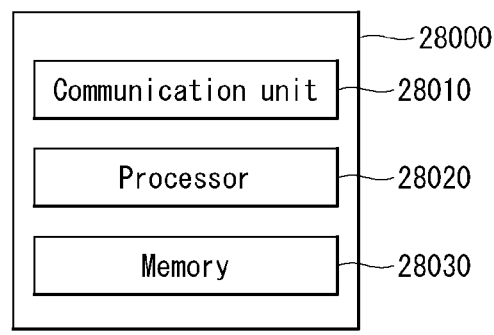
FIG. 28 illustrates a configuration of V2X communication apparatus according to an embodiment of the present disclosure.

FIG. 28 illustrates a configuration of V2X communication apparatus according to an embodiment of the present disclosure.

In FIG. 28, a V2X communication apparatus 28000 may include a communication unit 28010, a processor 28020 and a memory 28030.

The communication unit 28010 may be connected to the processor 28020 and transmit and/or receives wireless signals. The communication unit 28010 may transmit signals by up-converting the data received from the processor 28020 to a transmission/reception band or down-convert reception signals. The communication unit 28010 may implement an operation of an access layer.

The communication unit 28010 may include a plurality of sub-RF units to communicate according to a plurality of communication protocols. As an embodiment, the communication unit 28010 may perform the ITS-G5 wireless communication technique based on Dedicated Short Range Communication (DSRC), IEEE 802.11 and/or 802.11p standard, and the physical transmission technique of IEEE 802.11 and/or 802.11p standard, the 2G/3G/4G(LTE)/5G wireless cellular communication technique including satellite/broadband wireless mobile communication, the broadband ground wave digital broadcasting technique such as DVB-T/T2/ATSC, the GPS technique, the IEEE 1609 WAVE technique, and the like. The communication unit 28010 may also include a plurality of transceivers that implements each of the communication techniques.

The processor 28020 may be connected to an RF unit 28030 and implement operations of layers according to the ITS system or the WAVE system. The processor 28020 may be configured to perform the operation according to the various embodiments of the present disclosure according to the drawings and the description described above. In addition, at least one of a module, data, program or software that implements an operation of the V2X communication apparatus 28000 according to the various embodiments of the present disclosure described above may be stored in the memory 28010 and performed by the processor 28020.

The memory 28010 may be connected to the processor 28020 and store various types of information for driving the processor 280201. The memory 28010 may be included in the processor 28020 or installed outside of the processor 28020 and connected to the processor 28020 by well-known means.

The processor 28020 of the V2X communication apparatus 28000 may perform the forwarding algorithm described in the present disclosure and perform the geo-networking packet transmission. The geo-networking packet transmission method of the V2X communication apparatus 28000 is described below.

Figure 29:
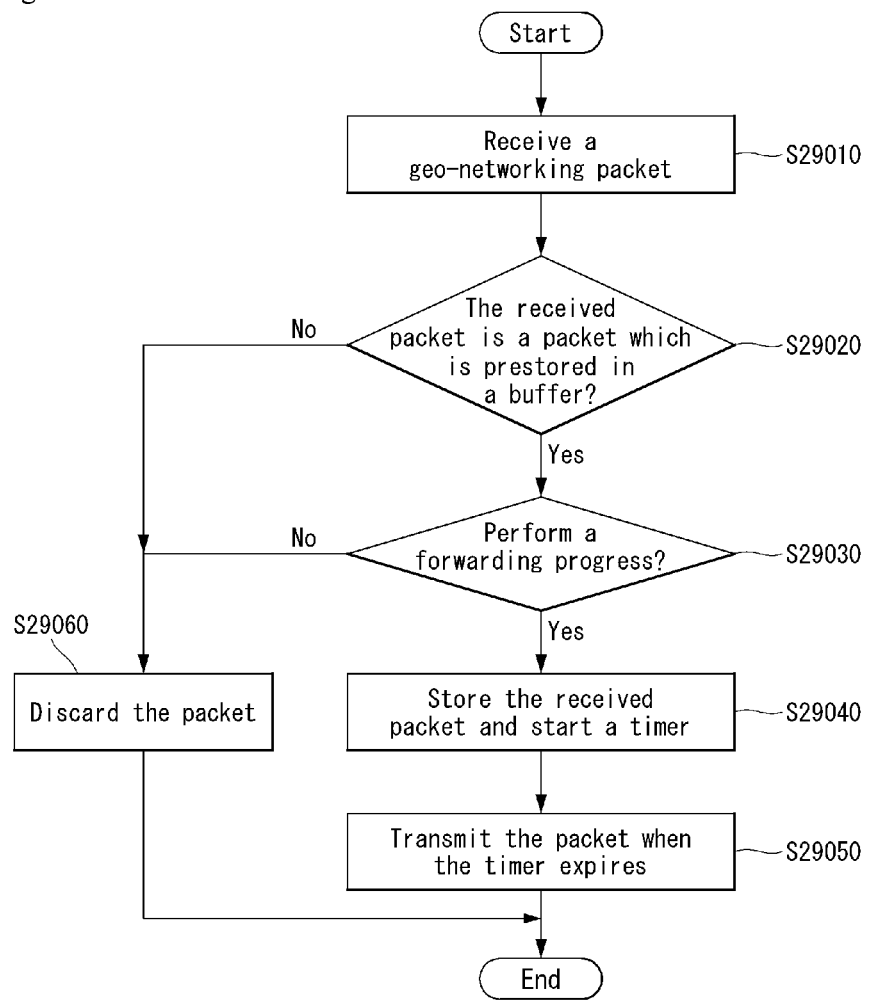
FIG. 29 illustrates a flowchart for a geo-networking transmission method according to an embodiment of the present disclosure.

FIG. 29 illustrates a flowchart for a geo-networking transmission method according to an embodiment of the present disclosure.

The V2X communication apparatus receives a geo-networking packet (step, S29010).

The V2X communication apparatus identifies whether the received geo-networking packet is a packet which is prestored in a buffer (step, S29020).

In the case that the received geo-networking packet is not a packet which is prestored in the buffer, the V2X communication apparatus determines whether to perform a forwarding progress of the geo-networking packet (step, S29030). In the embodiments and the pseudo-codes described above, the step of determining whether to perform the forwarding progress includes an operation until the reception packet is stored in the buffer after determining whether the packet is prestored.

When the forwarding progress is determined (step, S29030), the V2X communication apparatus stores the received geo-networking packet in the buffer and starts a timer (step, S29040). Furthermore, when the timer expires, the V2X communication apparatus transmits the packet (step, S29050). When the forwarding progress is not determined (step, S29030), the V2X communication apparatus may discard the received geo-networking packet (step, S29060). With respect to the packet forwarding, the timer configuration, the timer start, the packet transmission when the timer expires and the packet discard of the V2X communication apparatus, the description in relation to FIG. 11 to FIG. 24 described above is applied.

The geo-networking packet includes the threshold information for limiting the valid transmission area. In addition, the step of determining whether to perform the forwarding progress further includes determining whether the V2X communication apparatus is positioned in the valid transmission area.

The threshold information may include at least one of the X-axis threshold distance, the Y-axis threshold distance and the threshold angle. The X-axis threshold distance may indicate a destination direction threshold distance in a communication range, the Y-axis threshold distance may indicate a threshold distance in a direction perpendicular to destination in a communication range and the threshold angle may indicate a destination direction threshold angle. The threshold information may be included in a header of the geo-networking packet as described in the embodiments of FIGS. 25 to 27.

The step of determining whether the V2X communication apparatus is positioned in the valid transmission area may be performed by setting a PROG value which is a difference between a distance between a sender and a destination and a distance between the destination and the V2X communication apparatus and determining whether the PROG value is greater than the X-axis threshold distance. The determination method may be performed according to the description of the embodiments shown in FIG. 17 and FIG. 18.

The step of determining whether the V2X communication apparatus is positioned in the valid transmission area may be performed by setting a PROG value which is a difference between a distance between a sender and a destination and a distance between the destination and the V2X communication apparatus and determining whether the PROG value is greater than 0 and the Y-axis distance of the V2X communication apparatus is smaller than the Y-axis threshold distance. The determination method may be performed according to the description of the embodiments shown in FIG. 19 and FIG. 20.

The step of determining whether the V2X communication apparatus is positioned in the valid transmission area may be performed by setting a PROG value which is a difference between a distance between a sender and a destination and a distance between the destination and the V2X communication apparatus and determining whether the PROG value is greater than the X-axis threshold distance and the Y-axis distance of the V2X communication apparatus is smaller than the Y-axis threshold distance. The determination method may be performed according to the description of the embodiments shown in FIG. 21 and FIG. 22.

The step of determining whether the V2X communication apparatus is positioned in the valid transmission area may be performed by setting a PROG value which is a difference between a distance between a sender and a destination and a distance between the destination and the V2X communication apparatus and determining whether the PROG value is greater than 0 and the angle of the V2X communication apparatus is less than the threshold angle. The determination method may be performed according to the description of the embodiments shown in FIG. 23 and FIG. 24.

According to the present disclosure, highly reliable geo-networking transmission may be provided for dynamic communication environment. Furthermore, an effective transmission range is limited for selecting a candidate router that forwards a reception packet, and a transmission of redundant packet may be prevented. Since redundant packet transmission is prevented, a channel use efficiency for geo-networking may be improved. The present disclosure may maintain an effect of reliability improvement of a contents-based forwarding algorithm, and simultaneously, channel load increase and redundant transmission thereof may be prevented.

In the aforementioned embodiments, the elements and characteristics of the present disclosure have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present disclosure. The sequence of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being imitative from all aspects but should be construed as being illustrative. The scope of the present disclosure should be determined by reasonable analysis of the attached claims, and all changes within the equivalent range of the present disclosure are included in the scope of the present disclosure.

Mode for Invention

It is understood for a person skilled in the art that various modifications and alterations from the present disclosure are available without departing from the concept of the scope of the present disclosure. Accordingly, it is intended that the present disclosure includes the modifications and alterations of the present disclosure provided by the attached claims and the equivalent scope.

Both apparatus and method invention are mentioned in the present disclosure, and the descriptions of both the apparatus and the method invention may be applied with complementary manner.

Various embodiments are described in the Best Mode for Invention for embodying the present disclosure.

Industrial Applicability

The present disclosure is used in a series of vehicle communication fields.

It is understood for a person skilled in the art that various modifications and alterations from the present disclosure are available without departing from the concept of the scope of the present disclosure.

The invention claimed is:

1. A method of transmitting geo-networking by a V2X communication apparatus, comprising:
   receiving a geo-networking packet including threshold information for limiting a valid transmission area,
   wherein the geo-networking packet includes a basic header and an extended header,
   wherein the threshold information is included in one of the basic header and the extended header, and
   wherein the threshold information includes (i) an X-axis threshold distance representing a destination direction threshold distance in a communication range and (ii) a threshold angle representing a destination direction threshold angle;

identifying whether the received geo-networking packet is a packet which is prestored in a buffer;

determining whether a V2X communication apparatus is positioned in the valid transmission area, in order to perform a forwarding progress of the geo-networking packet, based on the received geo-networking packet not being a prestored packet, wherein the step of determining whether the V2X communication apparatus is positioned in the valid transmission area is performed by (i) setting a PROG value which is a difference between a distance between a source router and a destination and a distance between the destination and the V2X communication apparatus and (ii) determining whether the PROG value is greater than 0 and an angle of the V2X communication apparatus is less than the threshold angle, wherein the angle of the V2X communication apparatus is an angle between a vector in a direction from the source router to the destination and a vector in a direction from the source router to the V2X communication apparatus, and based on the V2X communication apparatus not being positioned within the valid transmission area, the method further comprising:

discarding the geo-networking packet;

based on the V2X communication apparatus being positioned within the valid transmission area, the method further comprising:

storing the received geo-networking packet in the buffer and starting a timer, based on the forwarding progress being determined; and transmitting the geo-networking packet, based on the timer expiring.

2. The method of claim 1, wherein the threshold information includes a Y-axis threshold distance representing a threshold distance in a direction perpendicular to destination in a communication range.

3. A V2X communication apparatus, comprising:
a memory for storing data;
at least one transceiver for transmitting and receiving a radio signal including a geo-networking packet; and
a processor for controlling the memory and the at least one transceiver, wherein the processor is configured to:
receive a geo-networking packet including threshold information for limiting a valid transmission area,
wherein the geo-networking packet includes a basic header and an extended header,
wherein the threshold information is included in one of the basic header and the extended header, and
wherein the threshold information includes (i) an X-axis threshold distance representing a destination direction threshold distance in a communication range and (ii) a threshold angle representing a destination direction threshold angle;

identify whether the received geo-networking packet is a packet which is prestored in a buffer;

determine whether a V2X communication apparatus is positioned in the valid transmission area, in order to perform a forwarding progress of the geo-networking packet, based on the received geo-networking packet not being a prestored packet, wherein the step of determining whether the V2X communication apparatus is positioned in the valid transmission area is performed by (i) setting a PROG value which is a difference between a distance between a source router and a destination and a distance between the destination and the V2X communication apparatus and (ii) determining whether the PROG value is greater than 0 and an angle of the V2X communication apparatus is less than the threshold angle, wherein the angle of the V2X communication apparatus is an angle between a vector in a direction from the source router to the destination and a vector in a direction from the source router to the V2X communication apparatus, and based on the V2X communication apparatus not being positioned within the valid transmission area, the processor is further configure to:

discard the geo-networking packet;

based on the V2X communication apparatus being positioned within the valid transmission area, the processor is further configured to:

store the received geo-networking packet in the buffer and starting a timer, based on the forwarding progress being determined; and transmit the geo-networking packet, based on the timer expiring.

* * * * *